US012572024B2

(12) United States Patent
Le et al.

(10) Patent No.: US 12,572,024 B2
(45) Date of Patent: Mar. 10, 2026

(54) CATADIOPTRIC LENS FOR NEAR EYE DISPLAY

(71) Applicant: Tencent America LLC, Palo Alto, CA (US)

(72) Inventors: John D. Le, Palo Alto, CA (US); Kun Gao, Palo Alto, CA (US); Yi Zhang, Palo Alto, CA (US); Youngshik Yoon, Palo Alto, CA (US); Hao Zheng, Palo Alto, CA (US); Hongdong Li, Palo Alto, CA (US); Jianru Shi, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 277 days.

(21) Appl. No.: 18/136,258

(22) Filed: Apr. 18, 2023

(65) Prior Publication Data

US 2024/0353687 A1 Oct. 24, 2024

(51) Int. Cl.
G02B 27/09 (2006.01)
G02B 5/30 (2006.01)
(Continued)

(52) U.S. Cl.
CPC ....... G02B 27/0955 (2013.01); G02B 5/3083 (2013.01); G02B 9/06 (2013.01);
(Continued)

(58) Field of Classification Search
CPC .. G02B 19/0028; G02B 17/08; G02B 17/045; G02B 17/0804; G02B 17/0808;
(Continued)

(56) References Cited

U.S. PATENT DOCUMENTS 10,663,745 B2 5/2020 Ouderkirk et al.
2010/0020409 A1* 1/2010 Shinohara ...... G02B 15/144511
359/683
(Continued)

FOREIGN PATENT DOCUMENTS

CN 105372793 A * 3/2016 ......... G02B 27/0025
CN 105892007 A * 8/2016 .......... G02B 13/004
(Continued)

OTHER PUBLICATIONS

Kress, B.C. and Peroz, C., Feb. 2020. Optical architectures for displays and sensing in augmented, virtual, and mixed reality (AR, VR, MR). In Proc. SPIE (vol. 11310, p. 1131001).
(Continued)

*Primary Examiner* — Ricky L Mack
(74) *Attorney, Agent, or Firm* — ArentFox Schiff LLP

(57) ABSTRACT

Aspects of the disclosure provide a first lens. The first lens can include an optically transparent member having a first surface and a second surface. The optically transparent member can be configured to receive light from a display device via the first surface. The received light exits the optically transparent member through the second surface. The first surface and the second surface of the optically transparent member can be aspheric. An in inner surface of the first surface is convex, and an outer surface of the first surface is concave. The inner surface is surrounded by the outer surface of the first surface. A thickness of a central region of the first lens can decrease from a center of the first lens, and a thickness of a peripheral region of the first lens can increase from a boundary of the central region.

16 Claims, 28 Drawing Sheets

(51) Int. Cl.

| | |
|---|---|
| *G02B 9/06* | (2006.01) |
| *G02B 17/08* | (2006.01) |
| *G02B 25/00* | (2006.01) |
| *G02B 27/01* | (2006.01) |
| *G02B 27/14* | (2006.01) |
| *G02B 27/28* | (2006.01) |

(52) U.S. Cl.
CPC ....... *G02B 17/0856* (2013.01); *G02B 25/001* (2013.01); *G02B 27/0172* (2013.01); *G02B 27/144* (2013.01); *G02B 27/283* (2013.01); *G02B 27/288* (2013.01)

(58) Field of Classification Search
CPC ............ G02B 17/0812; G02B 17/0888; G02B 17/086; G02B 17/0864; G02B 17/0868; G02B 17/02; G02B 17/023; G02B 17/026
See application file for complete search history.

(56) References Cited

U.S. PATENT DOCUMENTS

| | | | | |
|---|---|---|---|---|
| 2019/0302420 A1* | 10/2019 | Chang | ................ | G02B 13/0045 |
| 2024/0118526 A1* | 4/2024 | Chen | .................. | G02B 13/0045 |
| 2025/0020926 A1* | 1/2025 | Pedder | .............. | G02B 27/0093 |

FOREIGN PATENT DOCUMENTS

| | | | | | |
|---|---|---|---|---|---|
| CN | 112433343 A | * | 3/2021 | ......... | G02B 27/0172 |
| CN | 115097614 B | * | 12/2022 | ........... | G02B 13/003 |
| TW | M623420 U | * | 2/2022 | ........... | G02B 25/001 |
| WO | WO-2022255780 A1 | * | 12/2022 | ............. | G02B 13/06 |

OTHER PUBLICATIONS

Kress, B.C., 2020. Optical architectures for augmented-, virtual-, and mixed-reality headsets. (No Title). chapter 5-6 (p. 37-52).

Frisen, Lars, and Anders Glansholm. "Optical and neural resolution in peripheral vision." Investigative Ophthalmology & Visual Science 14.7 (1975): 528-536.

Costa, Ana Luiza Fontes de Azevedo, and Vagner Rogerio dos Santos. "From vision to citizenship: types of tables to assess reading in special education." Revista Brasileira de Oftalmologia 77 (2018): 296-302.

Wong, Timothy L., et al. "Folded optics with birefringent reflective polarizers." Digital Optical Technologies 2017. vol. 10335. SPIE, 2017, pp. 1-8.

Hao, B., Wong, T., Le, J., Aastuen, D., Kotz, A., Rosen, D., McGrath, K. and Kent, S., "Building a Predictive Model of Contrast Ratio of Folded Optic Lens Systems for Virtual Reality". 3M Company, 3M Center, St. Paul, MN, 2022, pp. 1-4.

International Search Report with Written Opinion for Application No. PCT/US2023/074534, mailed on Feb. 7, 2024, 18 pages.

* cited by examiner

CATADIOPTRIC LENS FOR NEAR EYE DISPLAY

TECHNICAL FIELD

The present disclosure describes embodiments generally related to near eye display technology.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Near eye display (NED) devices are being developed to provide an improved user experience in fields such as augmented reality (AR) and virtual reality (VR). The NED devices can include various wearable devices, such as a head mounted display (HMD) device, smart glasses, and the like. In an example, an HMD device includes a relatively small display device and optics that can create a virtual image in the field of view of one or both eyes. To the eye, the virtual image appears at a distance and appears much larger than the relatively small display device.

SUMMARY

Aspects of the disclosure provide a first lens. The first lens can include an optically transparent member having a first surface and a second surface. The optically transparent member can be configured to receive light from a display device via the first surface. The received light exits the optically transparent member through the second surface. The first surface and the second surface of the optically transparent member can be aspheric. An in inner surface of the first surface is convex, and an outer surface of the first surface is concave. The inner surface is surrounded by the outer surface of the first surface.

In an embodiment, a curve formed by an interception of the first surface of the first lens and a cross-sectional plane has at least four inflection points. The cross-sectional plane is parallel to an optical axis of the first lens.

In an embodiment, a plane that is perpendicular to an optical axis of the first lens intercepts the second surface of the first lens four times.

In an example, a sagitta difference between (i) a minimum sagitta at a first position of the first surface of the first lens and (ii) a maximum sagitta at a second position of the first surface of the first lens is from 1.5 millimeters (mm) to 2.5 mm.

In an example, a sagitta difference between (i) a minimum sagitta at a first position of the second surface of the first lens and (ii) a maximum sagitta at a second position of the second surface of the first lens is from 0.6 mm and 0.8 mm.

In an embodiment, a lens system includes the first lens and a second lens configured to direct the light from the display device to the first lens. The first lens is positioned between the second lens and a light receiver. The second lens is a converging lens.

In an example, the first lens and the second lens are separated by a gap.

In an embodiment, an optical system includes the lens system, a beam splitter configured to partially transmit and partially reflect light beams from the display device, a reflective polarizer configured to pass through light having a first linear polarization state and reflect light having a second linear polarization state that is orthogonal to the first linear polarization state, and a quarter waveplate (QWP) that is positioned between the beam splitter and the reflective polarizer. An optical axis of the first lens and an optical axis of the second lens are identical in the lens system, the beam splitter is on a first surface of the second lens that is configured to face the display device, and the reflective polarizer is on the second surface of the first lens.

In an example, the QWP is on a surface of (i) the first lens or (ii) the second lens.

In an example, the optical system includes the display device. A pixel array in the display device is configured to generate light beams. A polarization state of the light beams is a first circular polarization state. An optical cavity is formed between the beam splitter and the reflective polarizer. The optical cavity includes the first lens, the second lens, a gap between the first lens and the second lens, and the QWP. The beam splitter partially transmits one of the light beams. After the one of the light beams passes the optical cavity for a first time. The first circular polarization state of the one of the light beams is converted to the second linear polarization state by the QWP. The reflective polarizer reflects the one of the light beams having the second linear polarization state. After the one of the light beams passes the optical cavity for a second time, the one of the light beams is reflected by the beam splitter. After the one of the light beams passes the optical cavity for a third time, the second linear polarization state of the one of the light beams is converted to the first linear polarization state by the QWP, and the reflective polarizer transmits the one of the light beams having the first linear polarization state such that the one of the light beams is directed to the light receiver.

In an example, the optical system is included in a head mounted display (HMD). A field of view of the optical system is larger than or equal to 900, a distance between light receiver and the first lens is 15±2 millimeters (mm), a lens track length that is a distance between the second lens and the display device is from 12 to 21 mm, and a diagonal size of a region in the display device that generates the light beams is from 1.4 inches to 2.6 inches.

In an embodiment, a thickness of a central region of the first lens decreases from a center of the first lens, and a thickness of a peripheral region of the first lens increases from a boundary of the central region.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
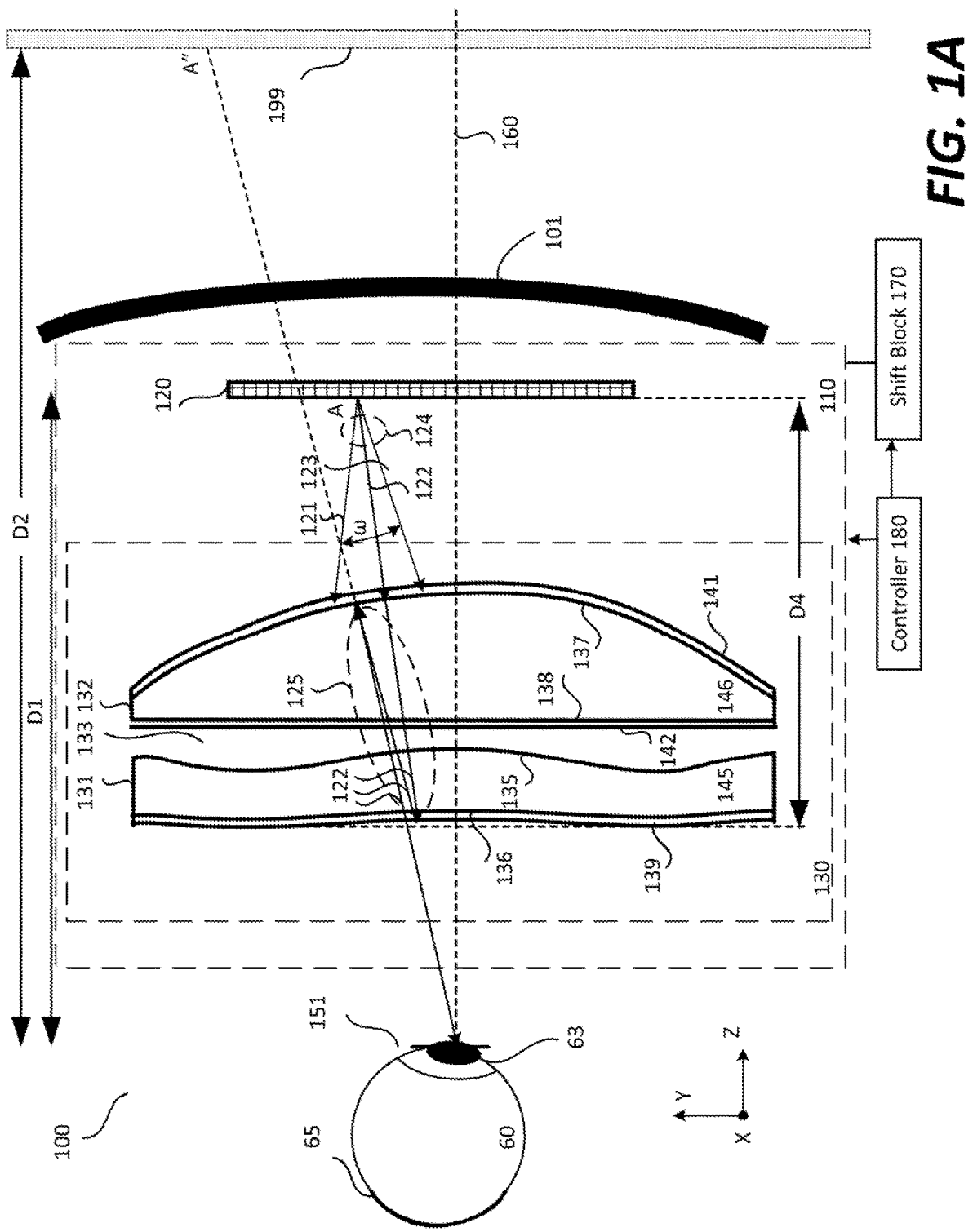
FIG. 1A shows a display system in a side view according to some embodiments of the disclosure.

FIG. 1A shows a display system (e.g., a near eye display system) (100) in a side view according to some embodiments of the disclosure. The display system (100) includes an optical system (110), a shift block (170) and a controller (180). The optical system (110) can include a display device (120), a lens system (130), a beam splitter (141), a reflective polarizer (139), and a quarter-wave plate (QWP) (142). The display device (120) can include a pixel array configured to emit light beams and display images. The lens system (130), the beam splitter (141), the reflective polarizer (139), and the QWP (142) can direct the emitted light beams from the display device (120) to an area (151). In an example, the area (151) is located in an XY plane, and is referred to as an exit pupil of the optical system (110). The XY plane includes an X axis and a Y axis that is orthogonal to the X axis. A light receiver or detector, such as an eye (60) of a user or the like, can be located at the area (151). In an example, a lens (63) in the eye (60) forms an image on a retina (65) of the eye (60), and thus the eye (60) perceives an image on the display device (120) as a virtual image, such as a virtual image (199) in FIG. 1A. The virtual image (199) appears at a distance D2 from the area (151) and appears larger than the image on the display device (120). The distance D2 is larger, and in some cases much larger, than a distance D1 between the area (151) and the display device (120).

Referring to FIG. 1A, an optical cavity is formed between the beam splitter (141) and the reflective polarizer (139). The optical cavity can include the lens system (130) and the QWP (142). As described below, an optical path of a light ray in a light beam is folded in the optical cavity between the beam splitter (141) and the reflective polarizer (139). Accordingly, the optical system (110) can be configured to be positioned within a distance threshold (e.g., 35 mm) of an eye of a user (e.g., the eye (60)), and the display system (100) can be referred to as a near eye display (NED) system. For example, the display system (100) is a head mounted display (HMD) system worn by a user.

According to an embodiment of the disclosure, the lens system (130) can include a first lens (131) and a second lens (132). In an example, the second lens (132) is a converging lens. At least one of (i) a first surface (135) and (ii) a second surface (136) of the first lens (131) is aspherical. The aspherical shape may include a wavy shape as described below.

Figure 1B:
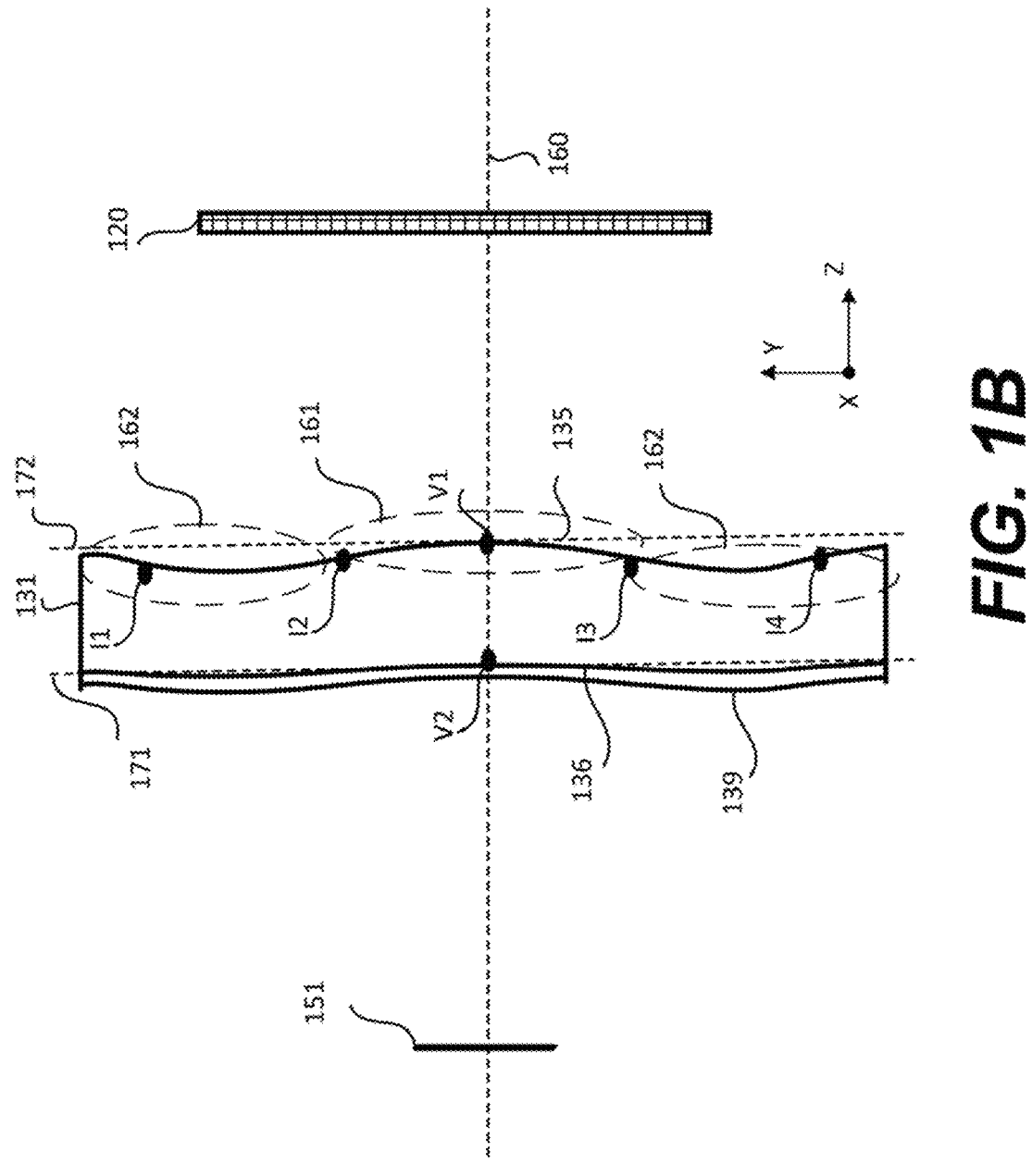
FIGS. 1B-1C show a first lens in the display system in a side view according to some embodiments of the disclosure.

For purposes of clarity, the first lens (131), the area (151), the display device (120) are redrawn in FIG. 1B. An optical axis (160) of the lens system (130) is also an optical axis of the first lens (131). The optical axis (160) is parallel to a Z axis that is perpendicular to the XY plane.

Referring to FIG. 1B, in an example, an inner surface (161) of the first surface (135) is convex or curves outward toward the display device (120), and an outer surface (162) of the first surface (135) is concave or curves away from the display device (120). The inner surface (161) can be surrounded by the outer surface (162) of the first surface (135).

Figure 1C:
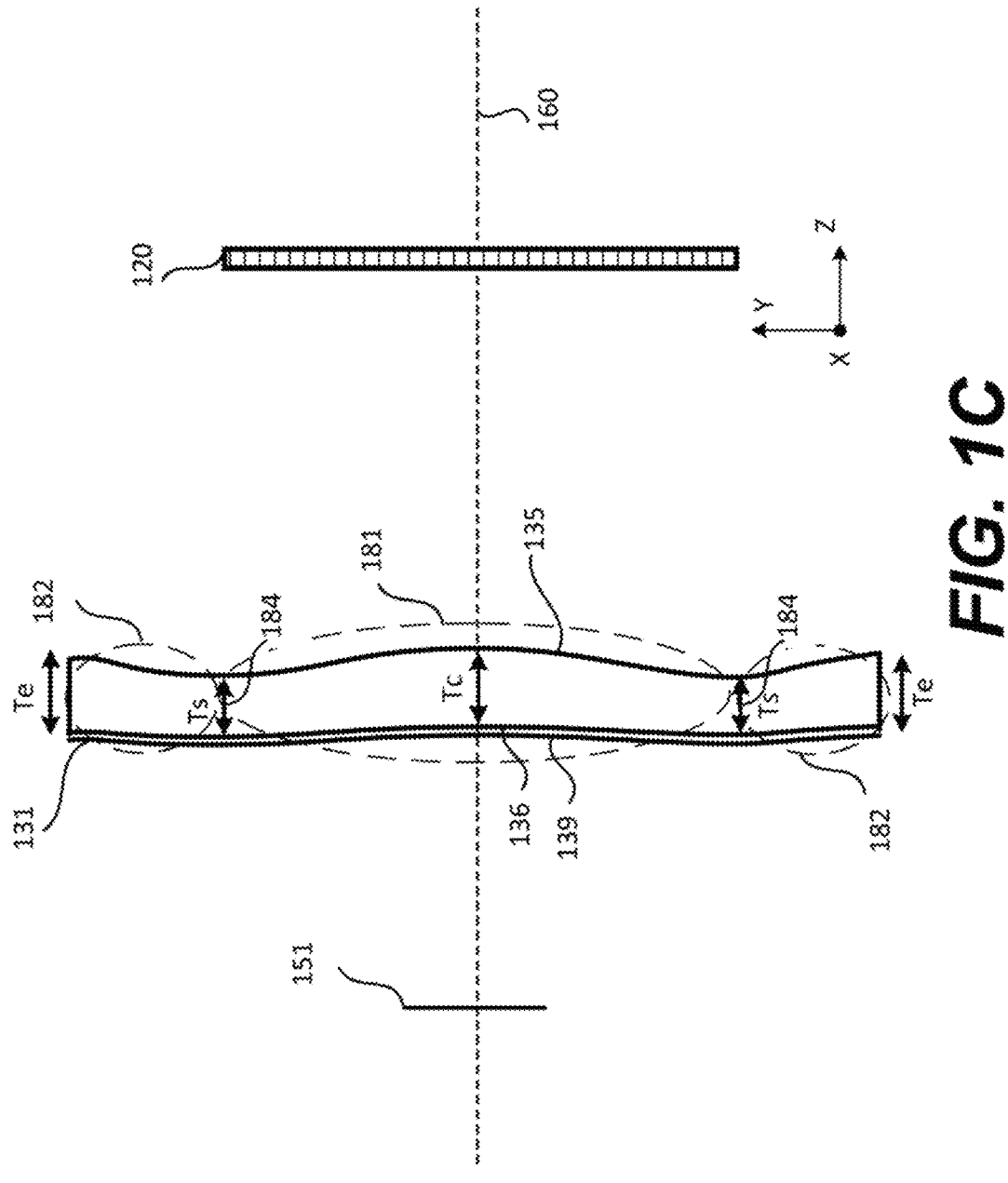

For purposes of clarity, the first lens (131), the area (151), and the display device (120) are redrawn in FIG. 1C. Referring to FIG. 1C, a thickness of the first lens (131) varies along an axis (e.g., the Y axis) that is perpendicular to the optical axis (160). For example, the thickness of the first lens (131) decreases from Tc (e.g., a center thickness of the first lens (131)) until the thickness reaches a minimal thickness Ts at a boundary (184), and the thickness of the first lens (131) subsequently increases from the boundary (184) to a thickness Te (e.g., an edge thickness) at an edge of the first lens (131). As described below, the first lens (131) having the above shape(s) and/or the thickness profile can, for example, compensate for aberration of the second lens (132) and reduce an overall aberration of the lens system (130). Accordingly, the display system (100) employing the lens system (130) can generate virtual images with a higher resolution (e.g., indicating an ability of the display system (100) to distinguish object detail) and a larger field of view (FOV) while the display system (100) is compact.

The display system (100) can be a component in an artificial reality system. The artificial reality system can adjust reality in some manner into artificial reality and then present the artificial reality to a user. The artificial reality can include, e.g., a virtual reality (VR), an augmented reality (AR), a mixed reality (MR), a hybrid reality, or some combination and/or derivatives thereof. Artificial reality content may include completely generated content or generated content combined with captured (e.g., real world) content. The artificial reality content may include video, audio, haptic feedback, or some combination thereof, and any of which can be presented in a single channel or in multiple channels (such as stereo video that produces a three-dimensional effect to the user).

In some example, the display system (100) can be applied to playback of live or prerecorded video.

In an embodiment, a "near eye" display system can include an optical system (e.g., including one or more optical elements) that is configured to be placed within the distance threshold of an eye of a user when the NED system (100) (e.g., an HMD, or smart glasses) is utilized. Referring to FIG. 1A, the distance D1 between the display device (120) and the area (151) can be less than or equal to the distance threshold. In an example, the distance D1 is between the display device (120) and the eye (60).

The display system (100) can be a NED system implemented in various forms, such as an HMD system, smart glasses, a smart phone, and/or the like. In some examples, the artificial reality system is implemented as a standalone NED system. In some examples, the artificial reality system is implemented as a NED system connected to a host computer system, such as a server device, a console device, and the like.

The display device (120) can include a pixel array. In some examples, the pixel array includes multiple pixels arranged to form a two-dimensional surface. The two-dimensional surface of the display device (120) can be substantially flat or planar, can be curved, or can include a combination of flat and planar panels. The display device (120) can be a display panel. The display device (120) can include any suitable type(s) of display panel(s), such as a liquid crystal display (LCD) panel(s), an organic light emitting diode (OLED) panel(s), and/or the like. A resolution of the display device (120) can be defined according to pixels in the two dimensions or one of the two dimensions of the two-dimensional surface. Each pixel in the pixel array can generate a light beam. Each light beam can include a bundle of light rays in any suitable direction. For example, a pixel A on the display device (120) emits a light beam including a bundle of light rays in suitable directions. A subset (124) of the light rays in the light beam can be directed by the lens system (130) to the area (151). An angular span of the subset (124) of the light beam can be determined based on an acceptance angle ω of the lens system (130). Three light rays (121)-(123) of the subset (124) of the light beam are shown in FIG. 1A. The three light rays (121)-(123) can include two boundary rays (121) and (123) and a center ray (122).

In general, a light beam is randomly polarized if the light beam includes a rapidly varying succession of different polarization states. A light beam can be polarized, such as linearly polarized (e.g., in a linear polarization state), circularly polarized (e.g., in a circular polarization state), elliptically polarized (e.g., in an elliptical polarization state), or the like. For the linearly polarized light, an electric field vector of the light beam is along a particular line. For the circularly polarized light, an electric field vector of the light beam rotates, e.g., clockwise or counter-clockwise as seen by an observer toward whom the light beam is propagating.

Degree of polarization (DOP) is a quantity that indicates a portion of an electromagnetic wave (e.g., a light beam) that is polarized. A perfectly polarized wave can have a DOP of 100%, and an unpolarized wave can have a DOP of 0%. A partially polarized wave can be represented by a superposition of a polarized component and an unpolarized component, and thus can have a DOP between 0 and 100%. DOP can be calculated as a fraction of a total power that is carried by the polarized component of the wave (e.g., a light beam).

A light beam (e.g., the light beam generated from each pixel) can have any suitable polarization state(s) or DOP. In an example, the light beam is circularly polarized having a DOP of 100%. In an example, the light beam is predominantly circularly polarized having a relatively large DOP that is above a threshold (e.g., 80% or above), such as a superposition of (i) a circularly polarized component and (ii) an unpolarized component and/or another polarization component. A circularly polarized light beam having a DOP of 100% or a predominantly circularly polarized light beam having a relatively large DOP can be referred to as a circularly polarized light beam below. In an example, a light beam is linearly polarized having a DOP of 100% or predominantly linearly polarized having a relatively large DOP that is above a threshold. A linearly polarized light beam having a DOP of 100% or a predominantly linearly polarized light beam having a relatively large DOP can be referred to as a linearly polarized light beam below.

According to an embodiment of the disclosure, the light beams generated by the display device (120) can be circularly polarized or linearly polarized.

The lens system (130) can be configured to modify the light beams generated by the display device (120), and direct the modified light beams to the area (151). In some embodiments, the lens system (130) can include diffractive elements (gratings and prisms), refractive elements (lenses), guiding elements (e.g., planar waveguides and/or fibers), and polarizing elements (e.g., polarizers, half-wave plates, quarter-wave plates, polarization rotators, Pancharatnam-Berry Phase lens—PBP-, and the like). In the example shown in FIG. 1A, the lens system (130) includes the first lens (131) and the second lens (132). The lens system (130) can have the optical axis (160). In an example, each of the first lens (131) and the second lens has circular symmetry around the optical axis (160). The optical axis (160) is also an optical axis of the second lens (132).

The first lens (131) can be disposed between the display device (120) and the area (151). The second lens (132) can be disposed between the first lens (131) and the display device (120). In an example, the first lens (131) can be referred to as an eye lens according to its proximity to the area (151) (e.g., the eye (60)), and the second lens (132) can be referred to as a display lens according to its proximity to the display device (120). The first lens (131) and the second lens (132) can be separated by a gap or space (133). In the example shown in FIG. 1A, the gap is larger than 0. In an example, a portion of the first lens (131) is in contact with a portion of the second lens (132), for example, the smallest distance between the first lens (131) and the second lens (132) is zero.

The first lens (131) can include an optically transparent member (145) having the first surface (135) and the second surface (136). The first surface (135) can face the display device (120). The optically transparent member (145) can be configured to receive light beams from the display device (120) via the first surface (135). The optically transparent member (145) can include any suitable material(s), such as glass, polymer, plastic material(s), or the like. In an example, the optically transparent member (145) includes poly(methyl methacrylate) (PMMA), polyimide, acrylic, styrene, cyclic olefin polymer, cyclic olefin co-polymer, polycarbonate, and/or the like. The first surface (135) and/or the second surface (136) of the first lens (131) can have any suitable shape(s), such as a planar shape parallel to the XY plane, a spheric shape with any suitable radius of curvature, an aspheric shape, or another shape.

The second lens (132) can include an optically transparent member (146) having a first surface (137) and a second surface (138). The first surface (137) can face the display device (120). The optically transparent member (146) can be configured to receive light beams from the display device (120) via the first surface (137). The optically transparent member (146) can include any suitable material(s), such as glass, polymer, plastic material(s), or the like. In an example, the optically transparent member (146) includes glass, such as borosilicate glass (e.g., BK7 glass), dense flint glass (e.g., SF1 glass), and/or the like. The first surface (137) and/or the second surface (138) of the second lens (132) can have any suitable shape(s), such as a planar shape parallel to the XY plane, a spheric shape with any suitable radius of curvature, an aspheric shape, or another shape.

In general, a glass lens (e.g., the second lens (132)) can be fabricated by grinding and polishing, a glass molding method, and/or the like. A polymer or plastic lens (e.g., the first lens (131)) can be fabricated by diamond turning, polishing, injection molding, casting, and/or the like.

According to an embodiment of the disclosure, at least one of the first surface (135) and the second surface (136) of the first lens (131) is aspheric. The second lens (132) is a converging lens where the first surface (137) is spheric (e.g., convex or curving towards the display device (120)), and the second surface (138) is planar that is parallel to the XY plane.

The beam splitter (141) and the reflective polarizer (139) can be disposed between the area (151) and the display device (120). The quarter-wave plate (142) can be disposed between the beam splitter (141) and the reflective polarizer (139). Anti-reflection (AR) coating(s) can be applied to any suitable surface(s) of the lens system (130) to reduce unwanted reflections of the light beams. In an example, AR coatings are applied to the first surface (135) of the first lens (131) and the second surface (138) of the second lens (132), respectively.

Figure 1D:
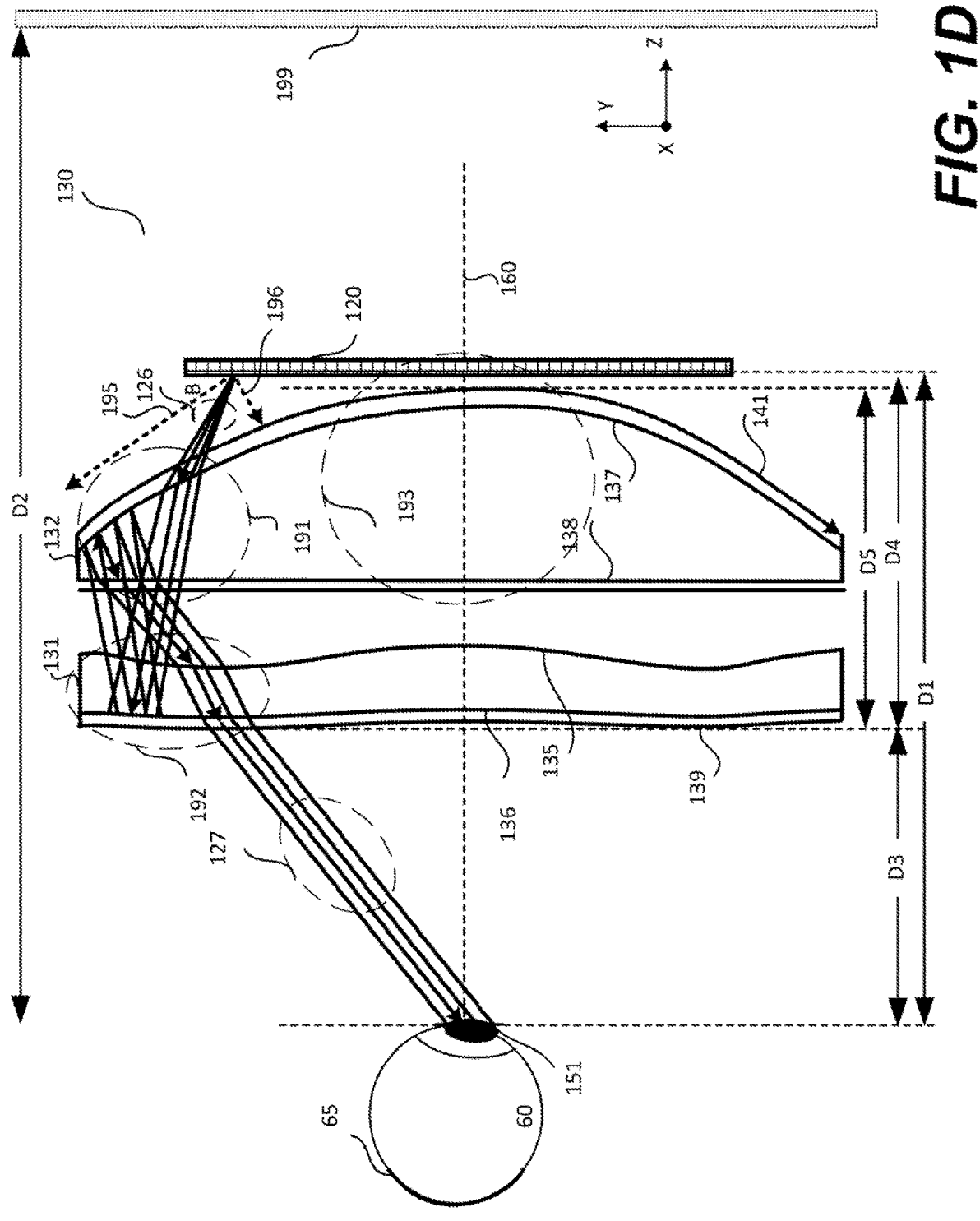
FIG. 1D show a lens system in the display system in a side view according to some embodiments of the disclosure.

The beam splitter (141) can be configured to partially transmit and partially reflect light beams incident onto the beam splitter (141). The beam splitter (141) can have an average optical transmittance T and an average optical reflectance R. In an example, a sum of T and R is 1 (i.e., 100%) over a wavelength range (e.g., 380 to 780 nanometers (nm)). The average optical transmittance T and the average optical reflectance R of the beam splitter (141) can be referred to as T/R. T or R can be in a range (e.g., from 40% to 60%). In an example, the beam splitter (141) has T/R of 40/60, 50/50, or 60/40. For example, if T and R are 50%, the beam splitter (141) transmits 50% and reflects 50% of the light beams incident onto the beam splitter (141). In general, a beam splitter can include one or more thin films coated or deposited on a surface of a lens (e.g., the second lens (132) or the first lens (131)) in the lens system (130). In an example, the beam splitter (141) is formed on the first surface (137) of the second lens (132) as shown in FIGS. 1A and 1D, and the beam splitter (141) can include one or more thin films coated or deposited on the first surface (137) of the second lens (132). The beam splitter (141) partially transmits and partially reflects light beams from the display device (120).

A polarization state of a light beam can be altered as the light beam passes through certain optical elements. In an embodiment, a polarization state of a light beam can be altered by a waveplate or a retarder as the light beam travels through the waveplate. The quarter-wave plate (142) can alter a polarization state of a light beam traveling through the quarter-wave plate (142) by 90° or $\pi/2$. In an example, the quarter-wave plate (142) converts linearly polarized light into circularly polarized light or circularly polarized light into linearly polarized light. The quarter-wave plate (142) can be formed on a surface of the first lens (131) or the second lens (132), such as the first surface (135), the second surface (136), the first surface (137), and the second surface (138).

The reflective polarizer (139) can be configured to pass through a light beam having a first linear polarization state and reflect the light beam having a second linear polarization state. The second linear polarization state is orthogonal to the first linear polarization state. The reflective polarizer (139) can include one or more layers of optical films. In an example, the reflective polarizer (139) is formed on a surface of the first lens (131) and the second lens (132), such as the second surface (136) of the first lens (131).

Referring to FIG. 1A, the beam splitter (141), the quarter-wave plate (142), and the reflective polarizer (139) are curved to conform to shapes of respective surfaces of the first lens (131) or the second lens (132).

Referring to FIG. 1A, the beam splitter (141) is disposed on the first surface (137) of the second lens (132), and the reflective polarizer (139) is disposed on the second surface (136) of the first lens (131). The quarter-wave plate (142) is formed on the second surface (138) of the second lens (132). The optical cavity can be formed between the beam splitter (141) and the reflective polarizer (139). The optical cavity can include the first lens (131), the second lens (132), the gap (133), and the QWP (142).

The light beams emitted from the display device (120) can be partially transmitted by the beam splitter (141). Subsequently, the light beams pass the optical cavity a plurality of times. In an example, the light beams pass the optical cavity for a first time and are reflected by the reflective polarizer (139). The light beams then pass the optical cavity for a second time and are partially reflected by the beam splitter (141). After passing the optical cavity for a third time, the light beams are transmitted by the reflective polarizer (139) and reach the area (151).

The optical system (110) includes a catadioptric optical system. For example, the catadioptric optical system (110) includes (i) refractive optical components (e.g., the lens system (130) and the beam splitter (141)) and (ii) reflective optical components (e.g., the beam splitter (141) and the reflective polarizer (139)).

The catadioptric optical system (110) may include a polarized catadioptric optical system. For example, each time the light beams pass through the QWP (142), a polarization state of the light beams is manipulated by the QWP (142). Accordingly, the light beams are in one polarization state and is reflected by the reflective polarizer (139) after the first pass, and the light beams are in another polarization state and is transmitted by the reflective polarizer (139) after passing the optical cavity for a third time.

The optical system (110) may be referred to as a folded optical system. As light beams are reflected between the beam splitter (141) and the reflective polarizer (139), and travel multiple times (e.g., three times) in the optical cavity, an optical path between the display device (120) and the area (151) includes a folded path (125) between the beam splitter (141) and the reflective polarizer (139). The folding of the optical path can allow the distance D1 to be decreased, and the display system (100) including the optical system (110) can be used as a NED system. In an example, the lens system (130) is designed to have a relatively small thickness D5, and may be referred to as a pancake lens system.

Referring to FIG. 1A, the ray (122) emitted from the pixel A of the display device (120) is partially transmitted by the beam splitter (141). Subsequently, the ray (122) passes the optical cavity for a first time where the ray (122) sequentially passes through the optically transparent member (146), the QWP (142), the gap (133), and the optically transparent member (145).

After the ray (122) passes the optical cavity for the first time, the ray (122) is reflected back into the optical cavity by the reflective polarizer (139). Subsequently, the ray (122) passes the optical cavity for a second time where the ray (122) sequentially passes through the optically transparent member (145), the gap (133), the QWP (142), and the optically transparent member (146).

After the ray (122) passes the optical cavity for the second time, the ray (122) is partially reflected back into the optical cavity by the beam splitter (141). Subsequently, the ray (122) passes the optical cavity for a third time where the ray (122) sequentially passes through the optically transparent member (146), the QWP (142), the gap (133), and the optically transparent member (145). Then, the ray (122) is transmitted by the reflective polarizer (139) and travels to the area (151). In an example, the ray (122) is focused by the lens (63) of the eye (60) onto the retina (65), and the eye (60) perceives the ray (122) as if the ray (122) is from a virtual point A" on the virtual image (199).

According to an embodiment of the disclosure, the light beams emitted from the pixels (e.g., including the pixel A) in the display device (120) can be circularly polarized, for example, in a first circular polarization state. The beam splitter (141) partially transmits the ray (122) in the first circular polarization state. Then the ray (122) passes the optical cavity for the first time as described above. During the first pass, the first circular polarization state of the ray (122) is converted to the second linear polarization state by the QWP (142). The second linear polarization state is along a block direction of the reflective polarizer (139). The block direction of the reflective polarizer (139) refers to a direction where if an electric field vector of a light beam is along the block direction, the light beam is blocked by the reflective polarizer (139) and is not transmitted through the reflective polarizer (139). The reflective polarizer (139) reflects the ray (122) having the second linear polarization state, for example, with a relatively high average reflectance that is above or equal to a value (e.g., 90%) over a wavelength range (e.g., 380 to 780 nm). Then the ray (122) passes the optical cavity for the second time as described above, and the ray (122) is partially reflected by the beam splitter (141). Subsequently, the ray (122) passes the optical cavity for the third time as described above. During both the second pass and the third pass, the QWP (142) alters the polarization state of the ray (122). Accordingly, the second linear polarization state of the ray (122) is converted to the first linear polarization state that is parallel to a transmission direction of the reflective polarizer (139). Thus, the reflective polarizer (139) transmits the ray (122) having the first linear polarization state such that the ray (122) is directed to the area (151) with a relatively high transmittance that is above or equal to a value (e.g., 90%) over a wavelength range (e.g., 380 to 780 nm).

Referring to FIG. 1A, the optical path includes the folded path (125) between the reflective polarizer (139) and the beam splitter (141) due to the polarization change. In an example, the QWP (142) has two axes (e.g., a fast axis and a slow axis) that are in the XY plane. One of the two axes of the QWP (142) is oriented at 45° to an axis of the reflective polarizer (139).

To achieve high quality imaging, the reflective polarizer (139) is to have high-quality, such as a high reflectance (e.g., the high average reflectance) in the block direction, a high transmittance (e.g., the high average transmittance) in the pass direction, relatively small surface roughness, and the like. Further, the AR coating can be applied to any suitable surface(s) in the optical system (110), such as the first surface (135) of the first lens (131) and the second surface (138) of the second lens (132), to reduce or eliminate ghosting due to the multi-reflections at various interfaces.

Polarized catadioptric optical systems are emerging solutions for virtual reality HMDs. A good VR optical system can include a large pupil volume (also referred to as an eye box) to accommodate multiple interpupillary distances and to allow for eye rotation as the user scans across the FOV. In an example, the eye box indicates a volume where an eye receives an acceptable view of an image. A size and a location of the eye box can be related to a number of constraints, such as a FOV and image quality. In an example, the eye box indicates a range of eye positions, at the eye relief distance, from which an image produced by the optical system (110) is visible. The eye box can include eye movements, such as eye rotation and/or lateral movement.

An optical power can indicate a degree to which an optical system or an optical component (e.g., a lens or a curved mirror) converges or diverges light. In an example, the optical power of the optical component or system is equal to a reciprocal of a focal length f of the optical component or system. A higher optical power indicates (i) a stronger focusing power for a converging optical component/system or (ii) a stronger diverging power for a diverging optical component/system.

In a polarized catadioptric optical system, such as the optical system (110), a folded optical path (e.g., the folded path (125)) can be used to achieve a relatively high optical power with a compact form factor. In the example shown in FIG. 1A, the beam splitter (141) is a curved mirror that partially reflects and partially transmits light, and the reflective polarizer (139) is a curved mirror that reflects or transmits light depending on a polarization state of the light. In general, design freedoms available in a folded optical system (e.g., the optical system (110)) can provide benefits to HMD systems. The benefits can include a high resolution achieved with reflective imaging, a wide FOV (e.g., by using low aberration lenses), a compact size, a decreased weight, an ability to adjust focus, and forming a larger eye box. The FOV can indicate an extent of an observable world that is seen or detected by a light receiver (also referred to as an optical sensor). In an example, the FOV is indicated by a solid angle within which the light detector can detect or receive light. The optical system (110) shown in FIG. 1A can be manufactured by controlling a curved form and surface finish of the first lens (131) and the reflective polarizer (139) that is disposed on the first lens (131). A pancake optical system (e.g., the optical system (110)) can deliver a comfortable and immersive user experience.

The optical system (110) can have a large pupil volume to accommodate multiple interpupillary distances and to allow for eye rotation as a user scans across the FOV. An interpupillary distance (IPD) is a distance between centers of pupils of eyes of a user. IPDs can vary with respect to age, gender, or the like. The optical system (110) can be designed by taking IPD variance into account such that the optical system (110) can accommodate various users with different IPDs. In an example, IPDs vary from approximately 50 to 80 mm.

In an example, to allow users to enjoy VR without prescription glasses or with a dynamic focus, the optical system (110) can adjust a diopter of a lenses in the lens system (130) to match the prescription. In an example, the diopter indicates a virtual object distance. Increasing the diopter can make an object appear closer. The focus accommodation can be achieved by changing an optical power of the optical system. The optical power of a folded mirror cavity (e.g., the optical cavity between the beam splitter (141) and the reflective polarizer (139)) can be changed by varying a cavity length (or a gap) relative to a reference cavity length corresponding to a reference optical power.

Considering human factors, such as human vision (e.g., a FOV of a human eye, eye rotation), head rotation, and the like may help design optical parameters of the optical system (110). An optical design with a high resolution over a range of eye rotations can make a viewing experience of a user more natural.

Figure 2:
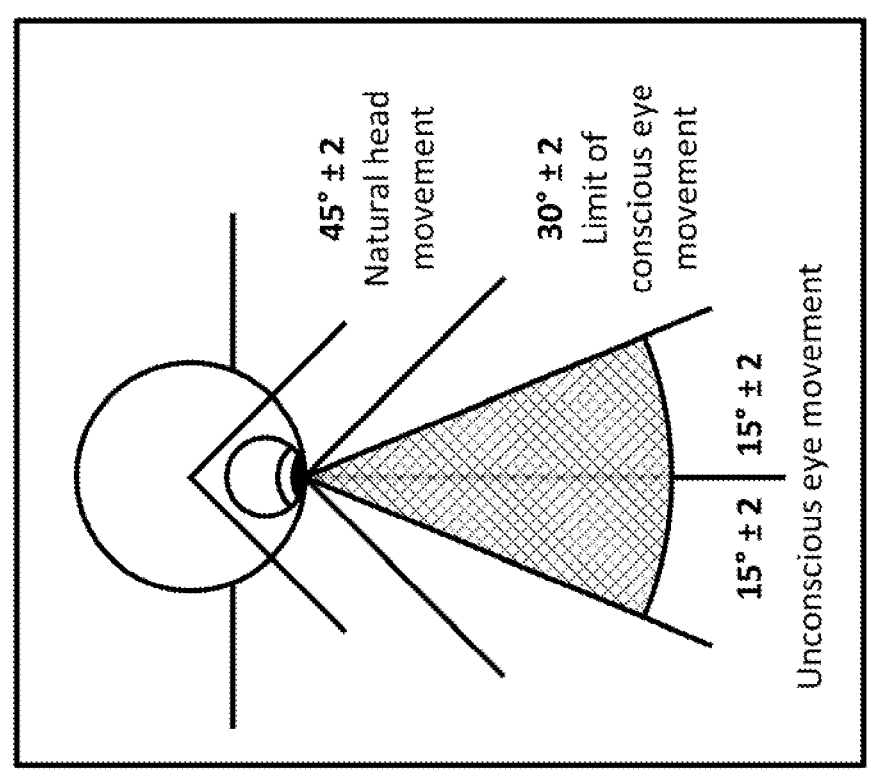
FIG. 2 shows examples of eye rotations and head rotations.

Unconstrained or unconscious eye rotation can be less than 20°. FIG. 2 shows examples of eye rotations and head rotations. A horizontal unconscious eye rotation can be less than a value (e.g., 20°) from a center to a left side or a right side, such as 15°±2°. A horizontal conscious eye rotation can be larger than that of the horizontal unconscious eye rotation. In an example, the horizontal conscious eye rotation is up to a value, such as 30°±2°. In another example, an eye can rotate approximately 28°±8° up, and 47°±8° down. FIG. 2 also shows an example of a natural head movement. In an example, the natural head movement is 45°±2° horizontally.

In an example, humans have a slightly over 210° forward-facing horizontal arc of visual fields without eye movements. A horizontal FOV of both human eyes can be 210°. A vertical range of the visual field (or the vertical FOV) in humans is around 150°.

Figure 3:
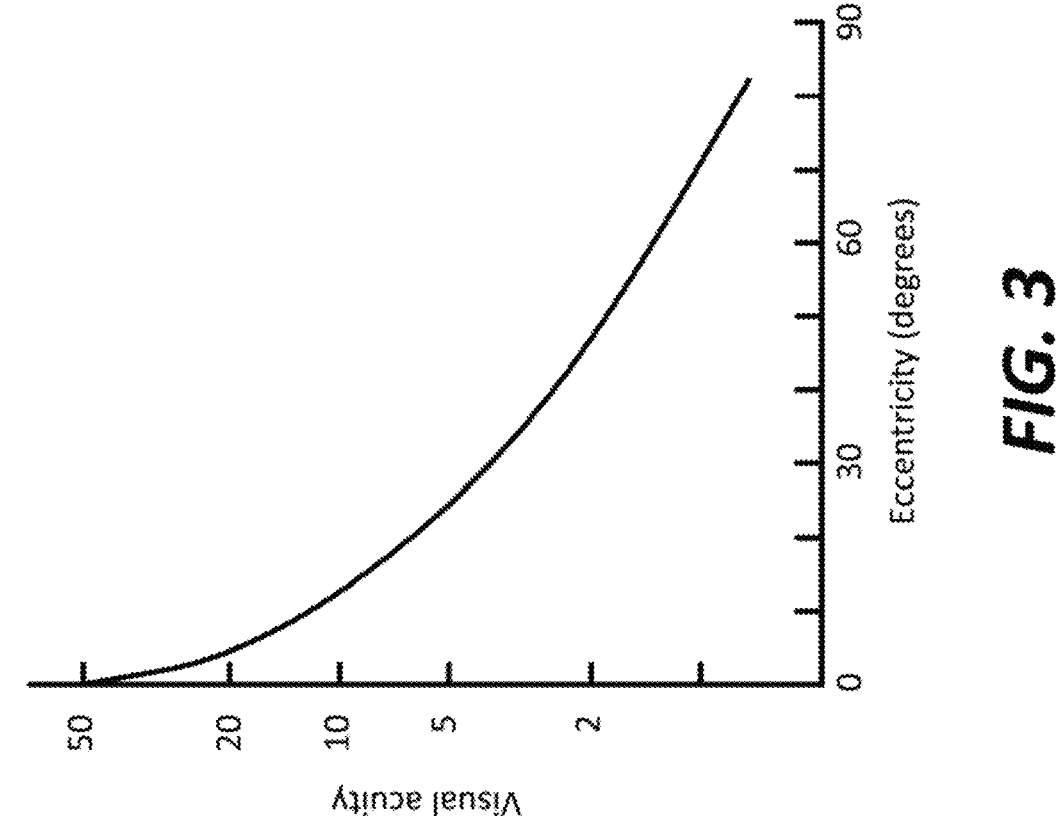
FIG. 3 shows a relationship between visual acuity and eccentricity.

A human eye is not a perfect lens over a large FOV. Visual acuity can indicate clarity or sharpness of vision. An eccentricity can refer to an angular distance from a center of a visual field or from the foveola of a retina. FIG. 3 shows a relationship between visual acuity (including peripheral visual acuity) and eccentricity. The visual acuity can decrease with the eccentricity. Accordingly, a resolution of an optical system in a peripheral field can be lower than a resolution of the optical system in a center field because eyes lack visual acuity in the peripheral field without eye rotation to gaze directly to the peripheral field. Considering visual acuity can avoid overdesign of an optical system.

Embodiments of the disclosure include sharp (e.g., having a high resolution) and compact (e.g., having a small size) polarized catadioptric VR optical systems utilizing one or more wavy shape lenses (e.g., the first lens (131) having one or more wavy surfaces) to achieve a wide FOV. The first lens (131) can have a wavy shape such that the display system (100) can have a relatively short lens track length (e.g., 12-18 mm), a relatively large display size (e.g., a diagonal length of 1.4-2.6 inches), a relatively large lens diameter (e.g., ≥45 mm), and/or a large FOV (e.g., ≥90°). The lens track length can indicate a distance between the display device (120) and the first lens (131) (e.g., the last optical component in the optical system (110) before the area (151)). Referring to FIG. 1A, the lens track length is a distance along the optical axis (160) between the display device (120) and the first lens (131). The display size can indicate a size of an area on the display device (120) from which the light beams emitted can be received by the area (151), such as the eye (60). The display size can be represented by a diagonal length, a radius (e.g., when the area on the display device (120) is circular), or the like. The lens diameter can indicate a size of a portion of the first lens (131) and/or a size of a portion of the second lens (132) that passes light. In an example, the size of the portion of the first lens (131) and the size of the portion of the second lens (132) that passes light are identical, and the lens diameter can indicate both the size of the portion of the first lens (131) and the size of the portion of the second lens (132) that passes light.

According to an embodiment of the disclosure, the second lens (132) is a plano-spheric lens. The first surface (137) and the second surface (138) of the second lens (132) are spheric and planar, respectively. The second lens (132) is a converging lens. The first lens (131) is an aspheric-aspheric lens where the first surface (135) and the second surface (136) of the first lens (131) are aspheric. Referring to FIG. 1A, the beam splitter (141) is disposed on the first surface (137) of the second lens (132), and the second lens (132) may also be referred to as a beam splitter lens. The reflective polarizer (139) is disposed on the second surface (136) of the first lens (131), and the first lens (131) may also be referred to as a reflective polarizer lens. In an example, the lens system (130) includes the beam splitter (141) and the reflective polarizer (139).

Referring to FIG. 1B, to reduce aberration of the second lens (132), at least one of (i) the first surface (135) and (ii) the second surface (136) of the first lens (131) has an aspheric shape. The aspheric shape may include a wavy or gull wing shape. For example, the inner surface (161) of the first surface (135) is convex or curves toward the display device (120), and the outer surface (162) of the first surface (135) is concave or curves away from the display device (120). The inner surface (161) can be surrounded by the outer surface (162) of the first surface (135).

In an embodiment, a curve formed by an interception of the first surface (135) of the first lens (131) and a cross-sectional plane can have at least four inflection points I1-I4. The cross-sectional plane can be the YZ plane that is parallel to the optical axis (160) of the lens system (130). Since FIG. 1B shows a cross-sectional view of the first lens (131), the curve formed by the interception of the first surface (135) of the first lens (131) and the YZ plane is also indicated by the first surface (135).

Referring to FIG. 1C, as described above, the thickness of the first lens (131) decreases from Tc at the optical axis (160) (e.g., along a center) of the first lens (131) until the thickness reaches the minimal thickness Ts at the boundary (184), and the thickness of the first lens (131) subsequently increases from the boundary (184) to the thickness Te towards the edge of the first lens (131). In a central region (181) of the first lens (131), the thickness of the central region (181) varies along the Y axis, for example, decreasing from Tc to Ts. In a peripheral region (182) of the first lens (131), the thickness of varies along the Y axis, for example, increasing from Ts at the boundary (184) to Te at the edge of the first lens (131).

In an embodiment, light beams passing through the first lens (131) and the second lens (132) can include first light beams and second light beams where the first light beams are closer to the optical axis (160) than the second light beams. Due to aberration of the second lens (132), the second light beams can experience a stronger converging power than the first light beams when the first light beams and the second light beams pass through the second lens (132). Due to the wavy shape of the first lens (131) as shown in FIGS. 1A-1C and described above, a first region in the first lens (131) that is at or close to the optical axis (160) can have more converging power for the first light beams incident onto the first region than a converging power of a second region of the first lens (131) that is close to the edge of the first lens (131) has for the second light beams incident onto the second region. Accordingly, the stronger converging power experienced by the second light beams in the second lens (132) can be compensated by the less converging power experienced by the second light beams in the first lens (131), and thus reducing the aberration of the lens system (130).

In an example, both the first region and the second region of the first lens (131) act as converging lenses, and the first region has a stronger converging power than that of the second region. In an example, the first region of the first lens (131) acts as a converging lens, and the second region of the first lens (131) acts as a diverging lens.

FIG. 1D shows an exemplary ray tracing according to an embodiment of the disclosure. A pixel B on the display device (120) generates a light beam. The light beam from the pixel B can travel along various directions with an angular span that is between boundary rays (195) and (196). A subset (126) of light rays of the light beam can be directed by the lens system (130) to the area (151). The subset (126) of the light beam from the pixel B can have a first cone angle (e.g., a first angular span of the subset (126) of the light beam). In some examples, light rays that are outside the first angular span of the subset (126) of light rays do not reach the area (151). The first angular span can be less than the angular span of the light beam from the pixel B. Four rays in the subset (126) are shown in FIG. 1D. For purposes of clarity, arrows are added to one of the four rays. As described above, an optical path of the subset (126) includes a folded optical path between the beam splitter (141) and the reflective polarizer (139).

The subset (126) is incident onto a region (191) in the second lens (132) that is close to the edge of the second lens (132), and experiences a stronger converging power than light beams incident onto a center region (193) of the second lens (132) that is closer to the optical axis (160). Light beams from other pixels (e.g., including the pixel A in FIG. 1A) can be incident onto the center region (193) in the second lens (132). The light beams from the other pixels can reach the area (151), and subsequently form a clear image of the other pixels on the retina (65) of the eye (60) positioned at the area (151). However, the aberration (e.g., spherical aberration) of the second lens (132) can result in a spot that is in front of the retina (65) for the pixel B. Thus, the pixel B appears to be blurry without aberration compensation. Due to the shape of the first surface (135) and/or the second surface (136) of the first lens (131), a region (192) in the first lens (131) onto which the subset (126) is incident is less converging than the center region of the first lens (131) that is closer to the optical axis (160). Thus, the aberration of the second lens (132) is compensated for and results in a spot that is on the retina (65) for the pixel B. Thus, the pixel B appears to be clear with the aberration compensation. As described in FIG. 1A, the eye (60) perceives a virtual image (e.g., (199)) of the pixel B and the other pixels that is located at the distance D2 away from the area (151).

Referring to FIG. 1D, the subset (126) is converted into a light beam (127) reaching the area (151). In an example, the light beam (127) is collimated where rays in the collimated light beam (127) are parallel. To the eye (60), the collimated light beam (127) appears to be a virtual image at infinity, and muscles in the eye (60) are relaxed when viewing the virtual image at infinity. In general, the subset (126) can be relatively collimated such that the virtual image (199) appears to be at a finite distance (e.g., D2 is finite) from the eye (60). The distance D2 can be relatively large such that the muscles in the eye (60) are relatively relaxed.

Referring to FIG. 1D, the subset (126) of the light beam from the pixel B can have the first cone angle, for example, determined based on a light intensity distribution of light emitted from the pixel B (with the light rays between the boundary rays (195) and (196)) and the acceptance angle ω of the lens system (130). The light beam (127) reaching the area (151) can have a second cone angle (e.g., a second angular span of the light beam (127)) that is based on the optical system (110). In an embodiment, the subset (126) can be relatively collimated, and the second cone angle is less (e.g., much less) than the first cone angle.

Various examples are provided for the optical system (110) including the lens system (130). In each of the examples below, the lens system (130) includes the first lens (e.g., the curved reflective polarizer lens) (131) that is an aspheric-aspheric lens and the second lens (132) that is a plano-spheric lens shown in FIGS. 1A and 1D. The first surface (135) of the first lens has a wavy shape, for example, and the thickness variation may be as described above with reference to FIGS. 1B-1D. The diameter of the first lens (131) and the second lens (132) can be larger than or equal to a value (e.g., 46 mm) for the FOV of larger than or equal to 90° at the eye relief of 15 mm. The optical system (110) can form the virtual image (199) from an image on the display device (120) for a suitable range of polychromatic wavelengths, such as in the visible wavelengths (e.g., 380 to 780 nm with a 400 nm), polychromatic wavelengths near green color (e.g., 500 to 540 nm with a 40 nm bandwidth), or the like.

Figure 4:
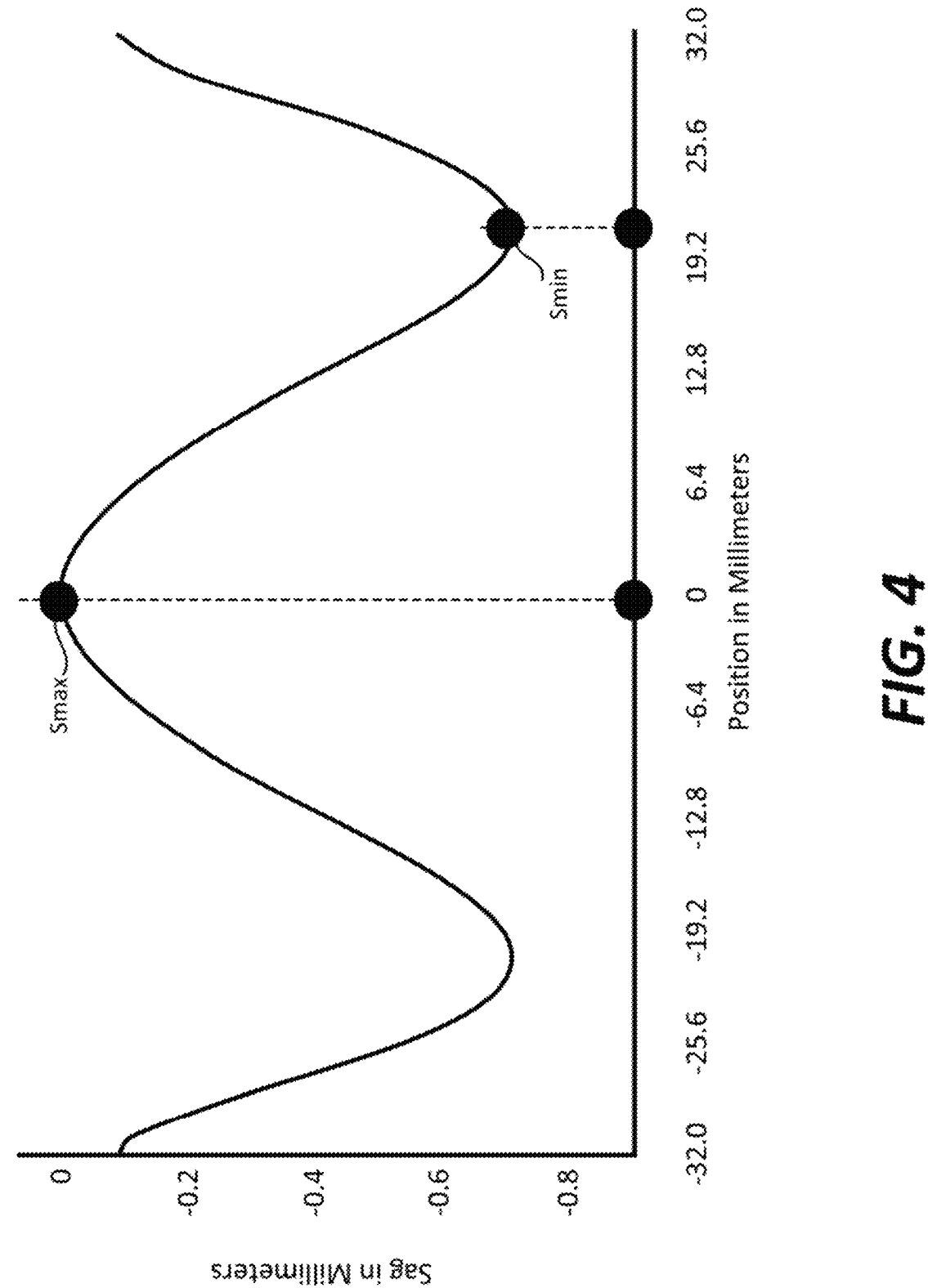
FIG. 4 shows a relationship between a sag of a second surface of the first lens and a position along an axis that is perpendicular to an optical axis of the first lens.
Figure 5:
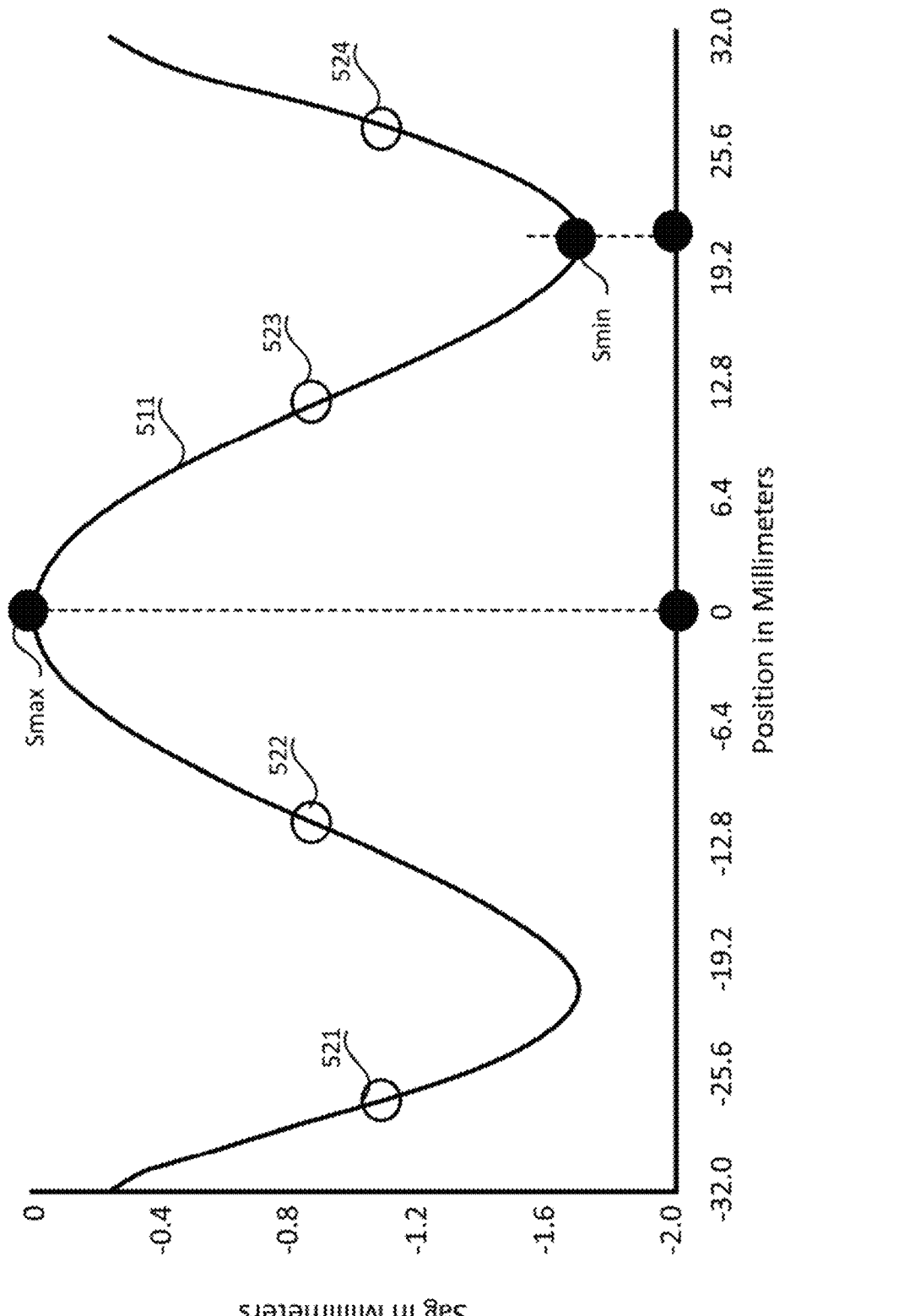
FIG. 5 shows a relationship between a sag of a first surface of the first lens and the position along the axis that is perpendicular to the optical axis of the first lens.

In a first example, referring to FIG. 1D, a distance D3 (also referred to as an eye relief) between the area (151) and the first lens (131) (e.g., the last optical component in the optical system (110) before the area (151)) is 15 mm. The distance D4 (i.e., the lens track length) between the display device (120) and the first lens (131) is 15.5 mm. In an example, D1 is equal to a sum of D3 and D4. The display size is indicated by a display image circle that is imaged by the optical system (110) onto the area (151), and the display image circle has a radius of 18.9 mm. A FOV of the optical system (110) is 110°. FIGS. 4-5 show first shapes of the first surface (135) and the second surface (136) of the first lens (131) and FIGS. 6-10 show performances of the optical system (110) that employs the first lens (131) with the first shapes shown in FIGS. 4-5 according to an embodiment of the disclosure.

A sagitta or a sag can indicate material removed to yield an optical surface (or an optical curve). In an example, for a spherical surface, the sag is a displacement along an optical axis from a vertex of the spherical surface at a distance from the optical axis. FIG. 4 shows a relationship between a sag (in mm) of the second surface (136) of the first lens (131) and a position along an axis (e.g., Y axis) that is perpendicular to the optical axis (160) of the first lens (131). In an example, referring to FIG. 1B, the sag shown in FIG. 4 indicates a distance along the optical axis (160) between a line (171) and a respective point on a curve (136) formed by an interception of the second surface (136) of the first lens (131) and the YZ plane. The line (171) passes through a vertex V2 of the second surface (136) and is tangential to the second surface (136).

FIG. 4 illustrates an example in which the second surface (136) of the first lens (131) has a wavy shape similar to the wavy shape of the first surface described in FIG. 1B. For example, a curve formed by an interception of the second surface (136) of the first lens (131) and the cross-sectional plane can have at least four inflection points (not labeled). Similarly, an inner surface of the second surface (136) that is closer to the optical axis (160) curves toward the display device (120), and an outer surface of the second surface (136) that is far away from the optical axis (160) curves away from the display device (120).

In FIG. 4, a sagitta difference between (i) a minimum sagitta $S_{min}$ at a first position (e.g., about 21 mm or −21 mm) of the second surface (136) of the first lens (131) and (ii) a maximum sagitta $S_{max}$ at a second position (e.g., 0 mm) of the second surface (136) of the first lens (131) is from 0.6 mm and 0.8 mm.

FIG. 5 shows a relationship between a sag (in mm) of the first surface (135) of the first lens (131) and the position along the axis (e.g., the Y axis) that is perpendicular to the optical axis (160). In an example, the sag in FIG. 5 is a distance along the optical axis (160) between a line (172) and a respective point on a curve (135) formed by an interception of the first surface (135) of the first lens (131) and the YZ plane. The line (172) passes through a vertex V1 of the first surface (135) and is tangential to the first surface (135). In FIG. 5, a sagitta difference between (i) a minimum sagitta Smin at a first position (e.g., about 21 mm or −21 mm) of the first surface (135) of the first lens (131) and (ii) a maximum sagitta Smax at a second position (e.g., 0 mm) of the first surface (135) of the first lens (131) is from 1.5 millimeters (mm) to 2.5 mm.

Referring to FIG. 5, the wavy shape of the first surface (135) can be indicated by the relationship between the sag of the first surface (135) and the position along the Y axis. For example, a curve (511) indicating the sag of the first surface (135) versus the position along the Y axis has four inflection points (521)-(524). The sag can oscillate multiple times (e.g., twice in FIG. 5) with the position along the Y axis, thus indicating the wavy shape of the first surface (135).

The lens diameter can indicate a size of a portion of the first lens (131) that passes light. In an embodiment, the lens radius can be smaller than to equal to the maximum position, for example, along the Y axis (e.g., 32 mm in FIGS. 4-5), and the lens diameter is ≤2× the maximum position, such as 64 mm in FIGS. 4-5.

A resolution of an optical system can indicate an ability of the optical system to distinguish object detail. In an example, the resolution is expressed in terms of line-pairs per millimeter (lp/mm) where a line-pair is a sequence of one black line and one white line.

A contrast or a modulation of an image can be defined as contrast (%)=$(I_{max}-I_{min})/(I_{max}+I_{min})$ where $I_{max}$ and $I_{min}$ represent a maximal intensity and a minimal intensity of the image, respectively.

One parameter that indicates the performance of an optical system is a modulation transfer function (MTF). The MTF of the optical system can indicate an ability of the optical system to transfer a contrast at a particular resolution from an object to an image of the object. In an example, the MTF incorporates the resolution and the contrast into a single parameter. As line spacing decreases (e.g., the resolution increases), it becomes increasingly difficult for the optical system to efficiently transfer the decrease in contrast. Thus, the MTF decreases.

Sagittal lines used in determining an MTF can refer to lines radiating from a center to an image circle periphery. Tangential (or meridional) lines are perpendicular to the sagittal lines. Because an optical system may not focus lines of both directions equally on a same plane, sagittal and tangential measurements for the same optical system can differ. An MTF can be a sagittal MTF if the sagittal lines are used to determine the MTF or a tangential MTF if the tangential lines are used to determine the MTF.

Figure 6:
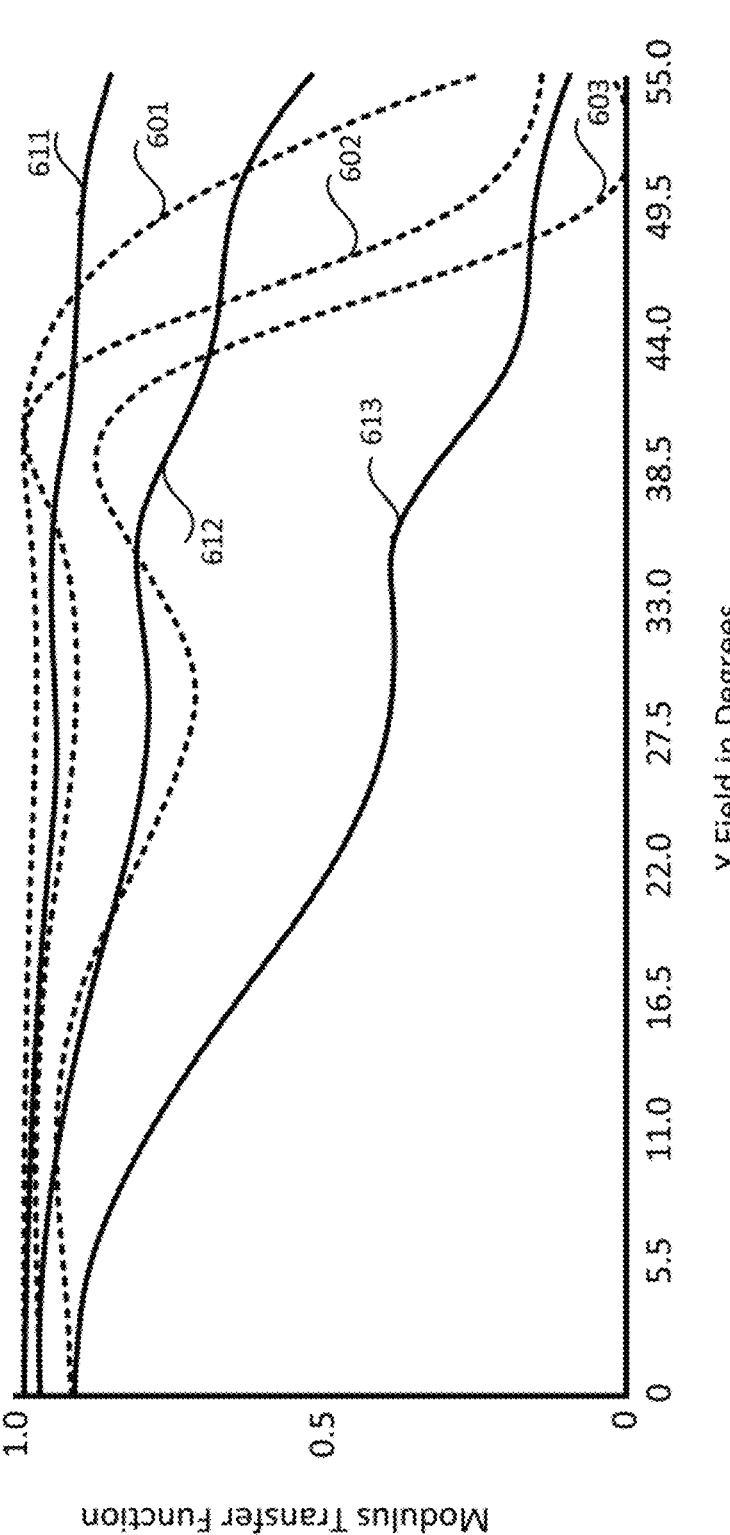
FIGS. 6-9 show modulation transfer functions (MTFs) of an optical system that employs the first lens.

FIGS. 6-9 show MTFs of the optical system (110) that employs the first lens (131) with the first shapes shown in FIGS. 4-5. In FIG. 6, the eye (60) is positioned at the area (151) with a gaze straight ahead without rotation (e.g., the field angle or eye rotation is) 0°. FIG. 6 shows sagittal and tangential MTFs versus a field angle (e.g., a Y field). Curves (601)-(603) represent the sagittal MTFs at resolutions 5 lp/mm, 10 lp/mm, and 20 lp/mm, respectively, for the field angle from 0° to 50°. Curves (611)-(613) represent the tangential MTFs at the resolutions 5 lp/mm, 10 lp/mm, and 20 lp/mm, respectively, for the field angle from 0° to 55°.

Figure 7:
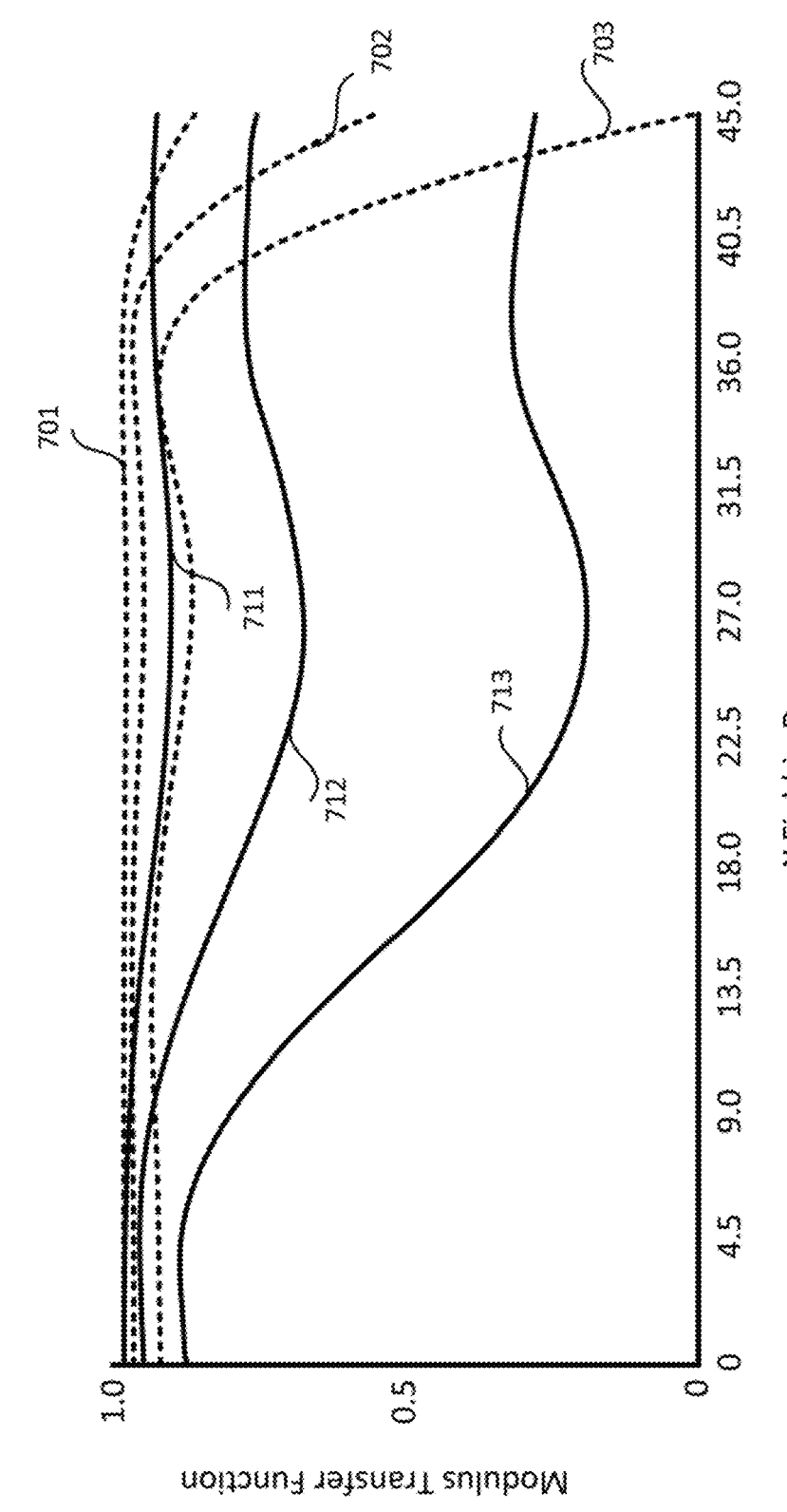

In FIG. 7, the eye (60) is positioned at the area (151) with a gaze at a field angle of 10°. FIG. 7 shows sagittal and tangential MTFs versus a field angle (e.g., a Y field). Curves (701)-(703) represent the sagittal MTFs at the resolutions 5 lp/mm, 10 lp/mm, and 20 lp/mm, respectively, for the field angle from 0° to 45°. Curves (711)-(713) represent the tangential MTFs at the resolutions 5 lp/mm, 10 lp/mm, and 20 lp/mm, respectively, for the field angle from 0° to 45°.

Figure 8:

In FIG. 8, the eye (60) is positioned at the area (151) with a gaze at a field angle of 20°. FIG. 8 shows sagittal and tangential MTFs versus a field angle (e.g., a Y field). Curves (801)-(803) represent the sagittal MTFs at the resolutions 5 lp/mm, 10 lp/mm, and 20 lp/mm, respectively, for the field angle from 0° to 40°. Curves (811)-(813) represent the tangential MTFs at the resolutions 5 lp/mm, 10 lp/mm, and 20 lp/mm, respectively, for the field angle from 0° to 40°.

Figure 9:
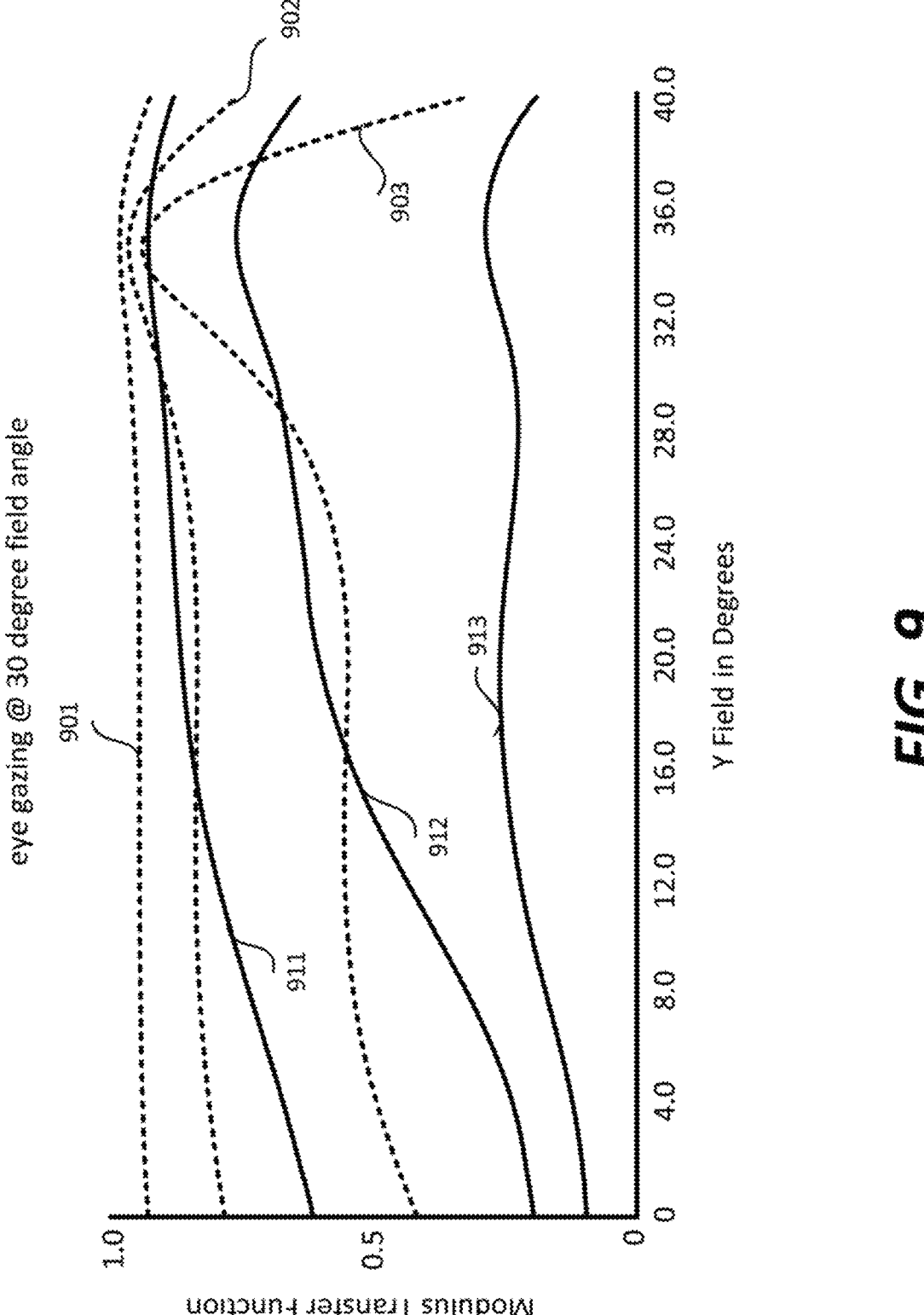

In FIG. 9, the eye (60) is positioned at the area (151) with a gaze at a field angle of 30°. FIG. 9 shows sagittal and tangential MTFs versus a field angle (e.g., a Y field). Curves (901)-(903) represent the sagittal MTFs at the resolutions 5 lp/mm, 10 lp/mm, and 20 lp/mm, respectively, for the field angle from 0° to 40°. Curves (911)-(913) represent the tangential MTFs at the resolutions 5 lp/mm, 10 lp/mm, and 20 lp/mm, respectively, for the field angle from 0° to 40°.

Referring back to FIGS. 6-9, the MTFs can vary with the resolution (e.g., 5, 10, or 20 lp/mm) and/or a gazing angle of an eye. In particular, the MTF at the resolution 20 lp/mm is larger than 80% at a 0° field angle and an eye rotation to 0°, the MTF at the resolution 20 lp/mm is larger than 40% at a 10° field angle and an eye rotation to 10°, the MTF at the resolution 20 lp/mm is larger than 25% at a 20° field angle and an eye rotation to 20°, and the MTF at the resolution 10 lp/mm is larger than 25% at a 30° field angle and an eye rotation to 30°. FIGS. 6-9 show that the FOV can be 110° (e.g., from a field angle of −55° to a field angle of) 55°, for example, at the resolution of 10 lp/mm.

Figure 10:
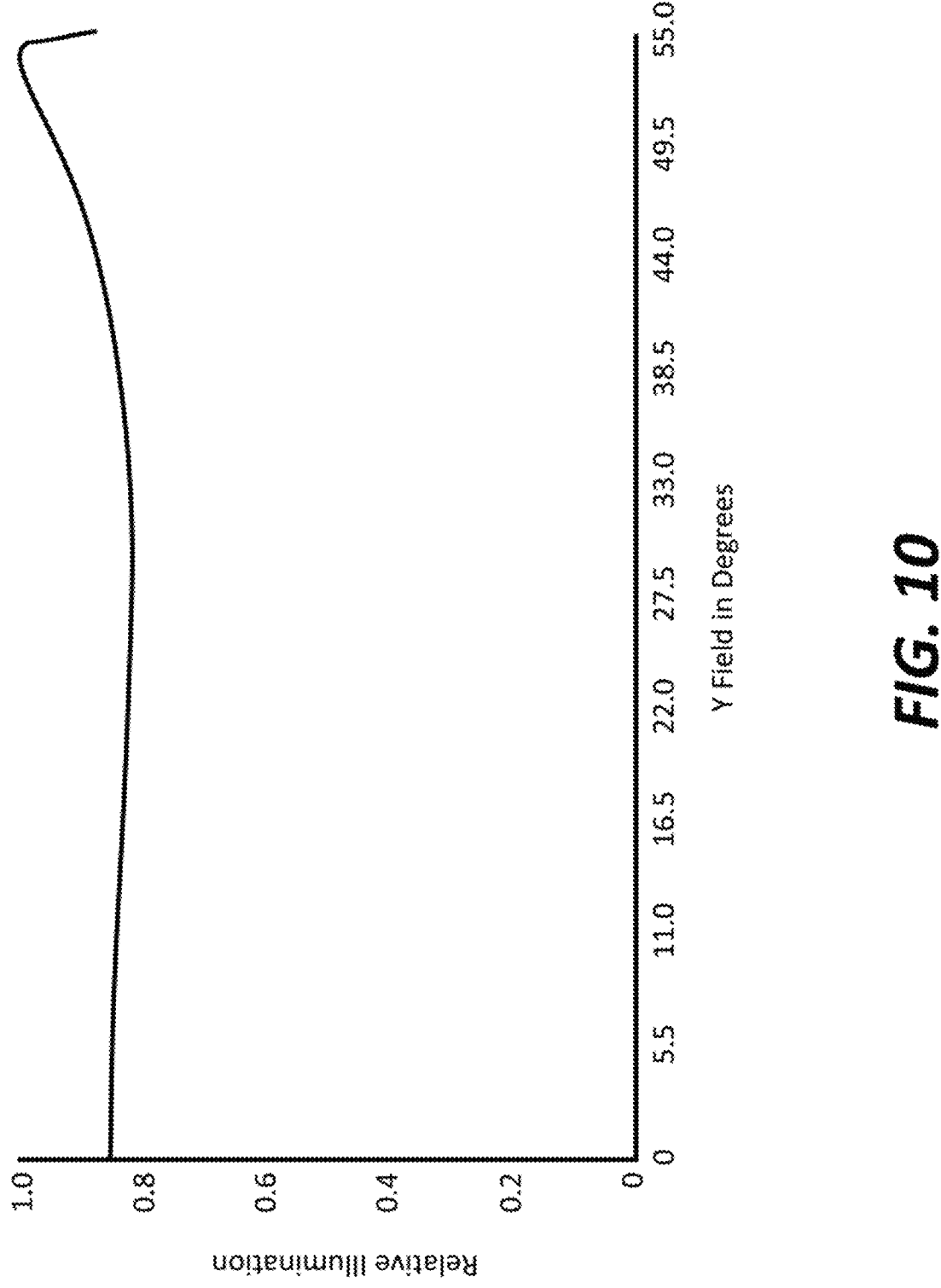
FIG. 10 shows relative illumination versus a field angle from 0° to 55°.

FIG. 10 shows relative illumination versus the field angle from 0° to 55°. The relative illumination can represent an intensity of illumination per unit area of an image surface normalized to an illumination at a point in the field that has a maximum illumination. In an example, the relative illumination analysis computes the relative illumination as a function of radial field coordinate for a uniform Lambertian scene. The relative illumination across the FOV (e.g., 110°) is above 80% or 0.8.

Figure 11A:
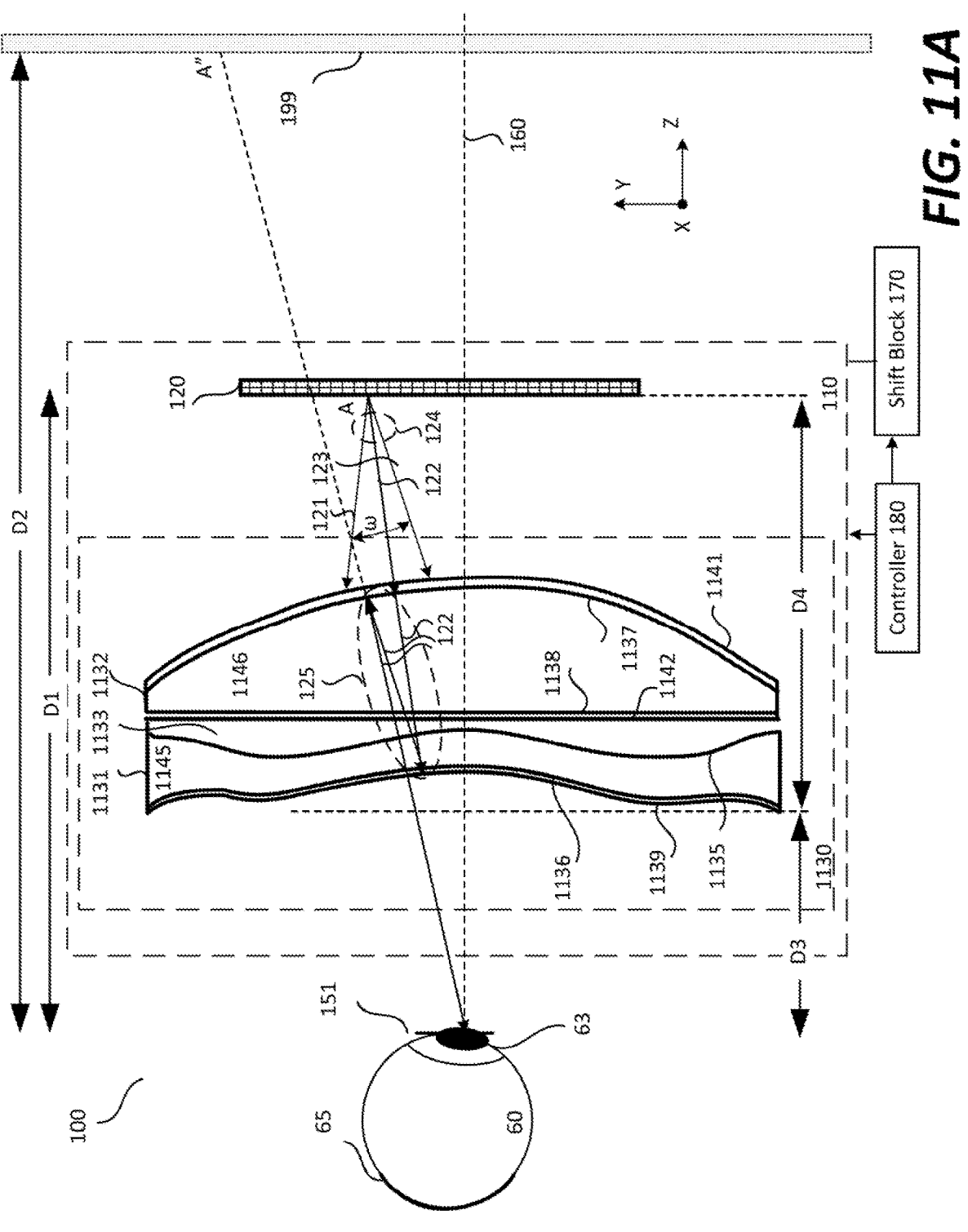
FIGS. 11A and 11B show an example of the display system including the optical system according to an embodiment of the disclosure.
Figure 11B:
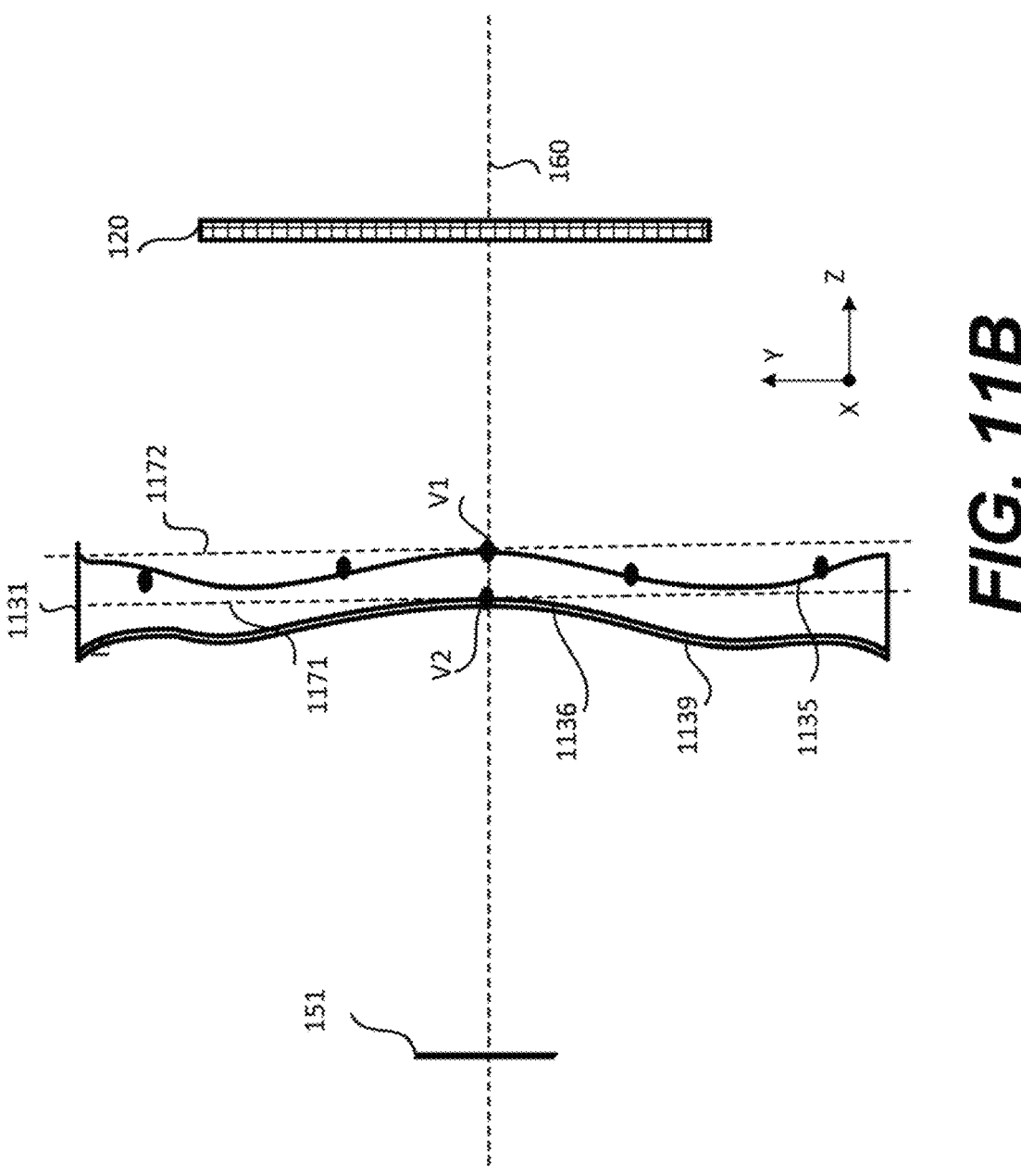

FIGS. 11A and 11B show a second example of the display system (100) including the optical system (110). The optical system (110) includes the display device (120). The display device (120), the area (151), and the eye (60) are described in FIG. 1A. The optical system (110) include a lens system (1130). The lens system (1130) includes a first lens (e.g., the curved reflective polarizer lens) (1131) that is an aspheric-aspheric lens and a second lens (1132) that is a plano-spheric lens. A first surface (1135) of the first lens (1131) has an aspheric (e.g., wavy) shape similar to that of the first surface (135) of the first lens (131) described above with references to FIGS. 1B and 1D. The first lens (1131) has a thickness variation similar to that of the first lens (131) described above with reference to FIG. 1C. The diameter of the first lens (1131) and the second lens (1132) can be larger than or equal to a value (e.g., 46 mm) for the FOV of larger than or equal to 100° at the eye relief of 15 mm. The optical system (110) in FIG. 11A can form the virtual image (199) from an image on the display device (120) for a suitable range of polychromatic wavelengths, such as in the visible wavelengths (e.g., 380 to 780 nm with a 400 nm), polychromatic wavelengths near green color (e.g., 500 to 540 nm with a 40 nm bandwidth), or the like.

The first lens (1131) and the second lens (1132) are separated by a gap (1133). The first lens (1131) can include an optically transparent member (1145) having the first surface (1135) and a second surface (1136). The second lens (1132) can include an optically transparent member (1146) having a first surface (1137) and a second surface (1138). The second lens (1132) can be identical or similar to the second lens (132) described in FIG. 1A. The optical system (110) can include a beam splitter (1141), a reflective polarizer (1139), and a QWP (1142) that are identical or similar to the beam splitter (141), the reflective polarizer (139), and the QWP (142) described in FIG. 1A.

The eye relief (or the distance D3) between the area (151) and the first lens (1131) is 15 mm. The distance D4 (i.e., the lens track length) between the display device (120) and the first lens (1131) is 12.5 mm. In an example, D1 is equal to a sum of D3 and D4. The display size as indicated by the display image circle has a radius of 14.8 mm. A FOV of the optical system (110) in FIG. 11A is 100°.

The optically transparent member (1145) can be identical or similar to the optically transparent member (145) described in FIG. 1A. The first surface (1135) can have a aspheric shape similar to that of the first surface (135) such as described in FIGS. 1A and 1B.

Figure 12:
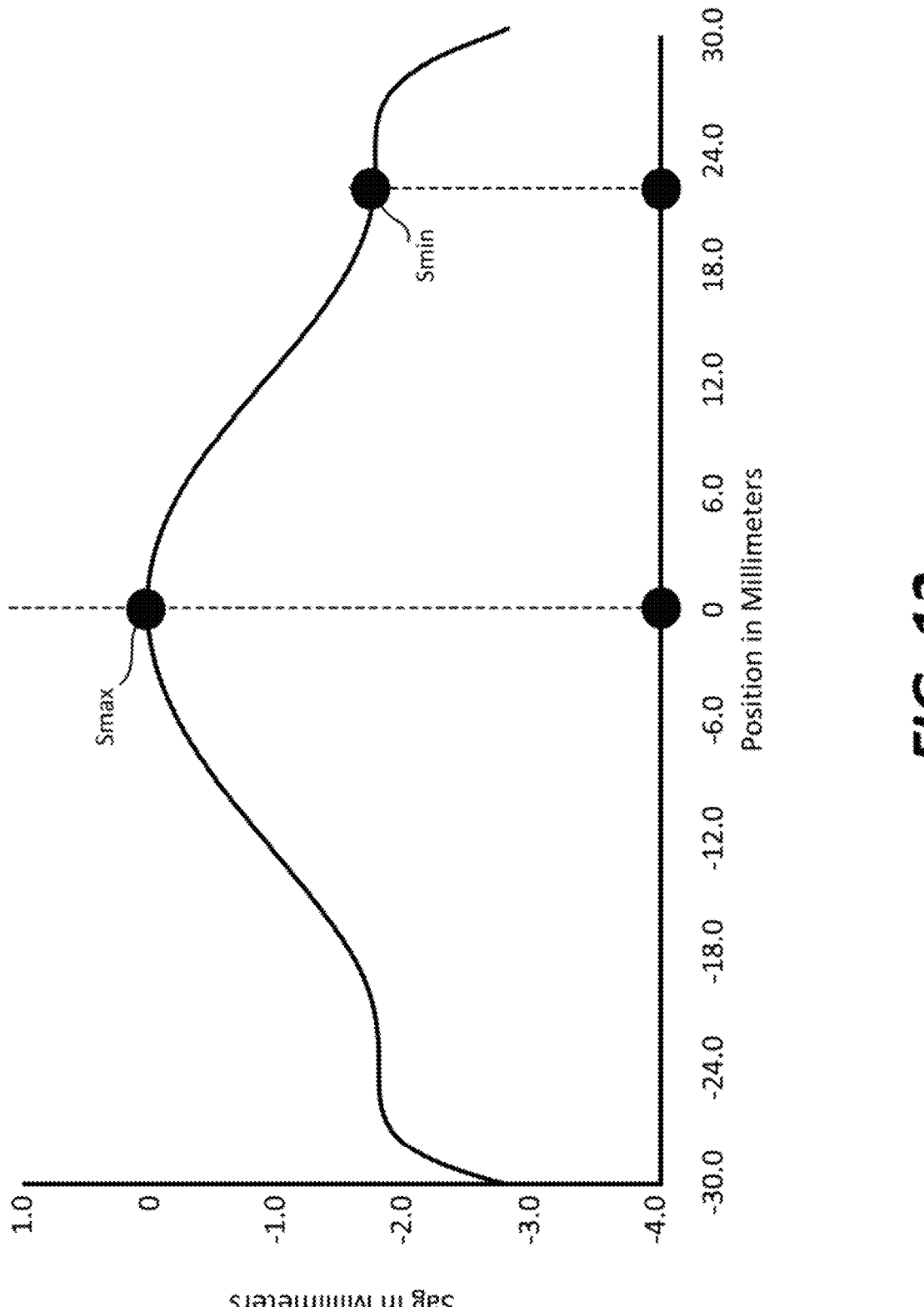
FIG. 12 shows a relationship between a sag of the second surface of the first lens and the position along the axis that is perpendicular to the optical axis of the first lens according to an embodiment of the disclosure.
Figure 13:
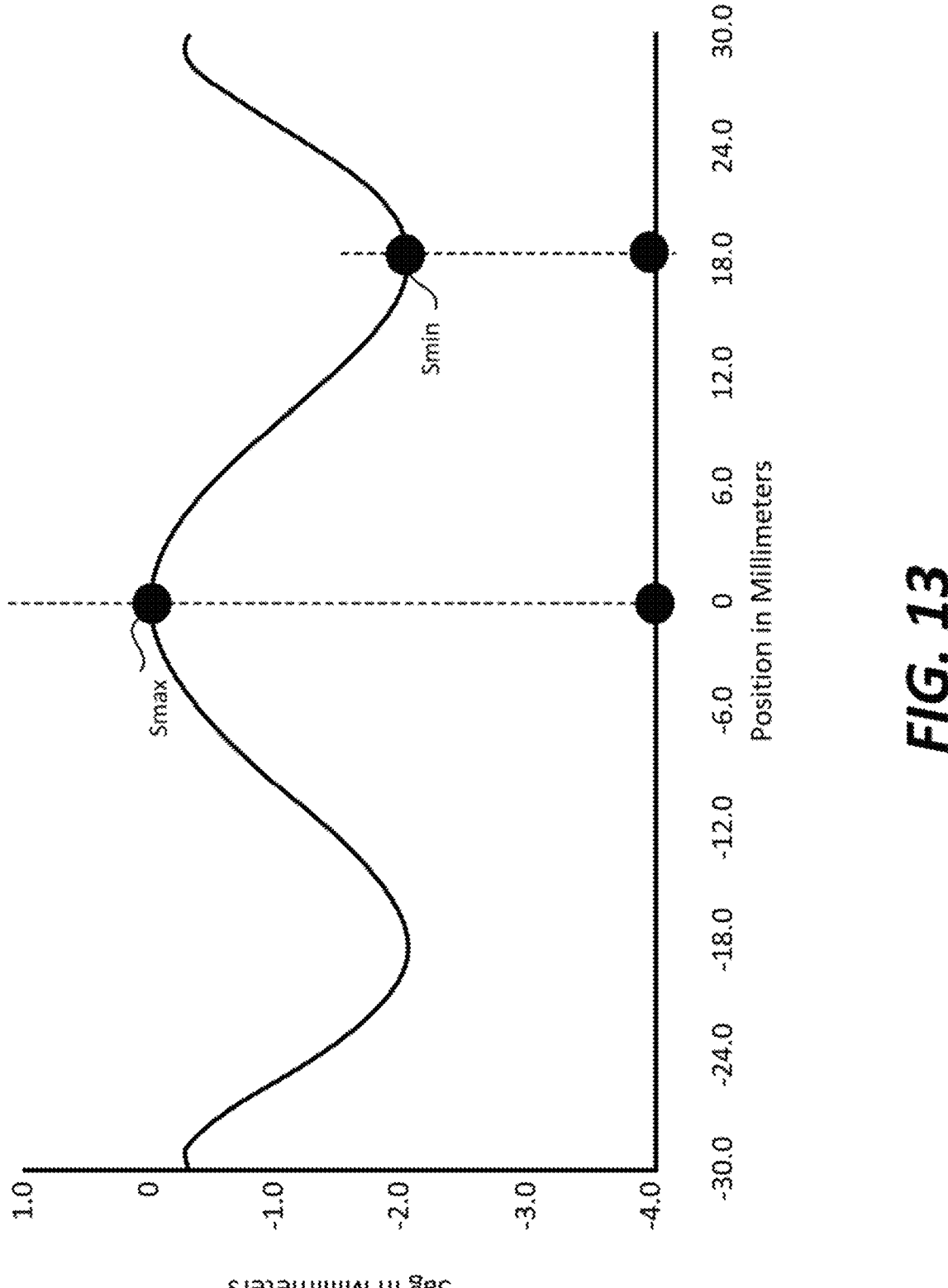
FIG. 13 shows a relationship between a sag of the first surface of the first lens and the position along the axis that is perpendicular to the optical axis of the first lens.

FIGS. 12-13 show exemplary shapes of the first surface (1135) and the second surface (1136) of the first lens (1131) and FIGS. 14-18 show performances of the optical system (110) in FIG. 11A that employs the first lens (1131) with the shapes shown in FIGS. 12-13 according to an embodiment of the disclosure.

FIG. 12 shows a relationship between a sag (in mm) of the second surface (1136) of the first lens (1131) and a position along the axis (e.g., the Y axis) that is perpendicular to the optical axis (160). For purposes of clarity, the first lens (1131), the area (151), and the display device (120) are redrawn in FIG. 11B. In an example, the sag shown in FIG. 11B indicates a distance along the optical axis (160) between a line (1171) and a respective point on a curve (1136) formed by an interception of the second surface (1136) of the first lens (1131) and the YZ plane. The line (1171) passes through a vertex V2 of the second surface (1136) and is tangential to the second surface (1136).

In an example, the diameter of the first lens (1131) (indicating the portion of the first lens (1131) that is used) is identical or similar to 46 mm. In FIG. 12, a sagitta difference between (i) a minimum sagitta $S_{min}$ at a first position (e.g., about 21 mm or −21 mm) of the second surface (1136) of the first lens (1131) and (ii) a maximum sagitta $S_{max}$ at a second position (e.g., 0 mm) of the second surface (1136) of the first lens (1131) is from 1.5 mm and 2 mm. A sag at an edge (e.g., 30 mm or −30 mm) of the second surface (1136) is less than $S_{min}$ at the first position, however, the sag at the edge of the second surface (1136) is not used in determining $S_{min}$ because the edge of the second surface (1136) is not used in transmitting light beams.

FIG. 13 shows a relationship between a sag (in mm) of the first surface (1135) of the first lens (1131) and the position along the axis (e.g., the Y axis) that is perpendicular to the optical axis (160). In an example, the sag in FIG. 13 is a distance along the optical axis (160) between a line (1172) and a respective point on a curve (1135) formed by an interception of the first surface (1135) of the first lens (1131) and the YZ plane. The line (1172) passes through a vertex V1 of the first surface (1135) and is tangential to the first surface (1135). In FIG. 13, a sagitta difference between (i) a minimum sagitta Smin at a first position (e.g., about 18 mm or −18 mm) of the first surface (1135) of the first lens (1131) and (ii) a maximum sagitta Smax at a second position (e.g., 0 mm) of the first surface (1135) of the first lens (1131) is from 1.5 millimeters (mm) to 2.5 mm.

Figure 14:
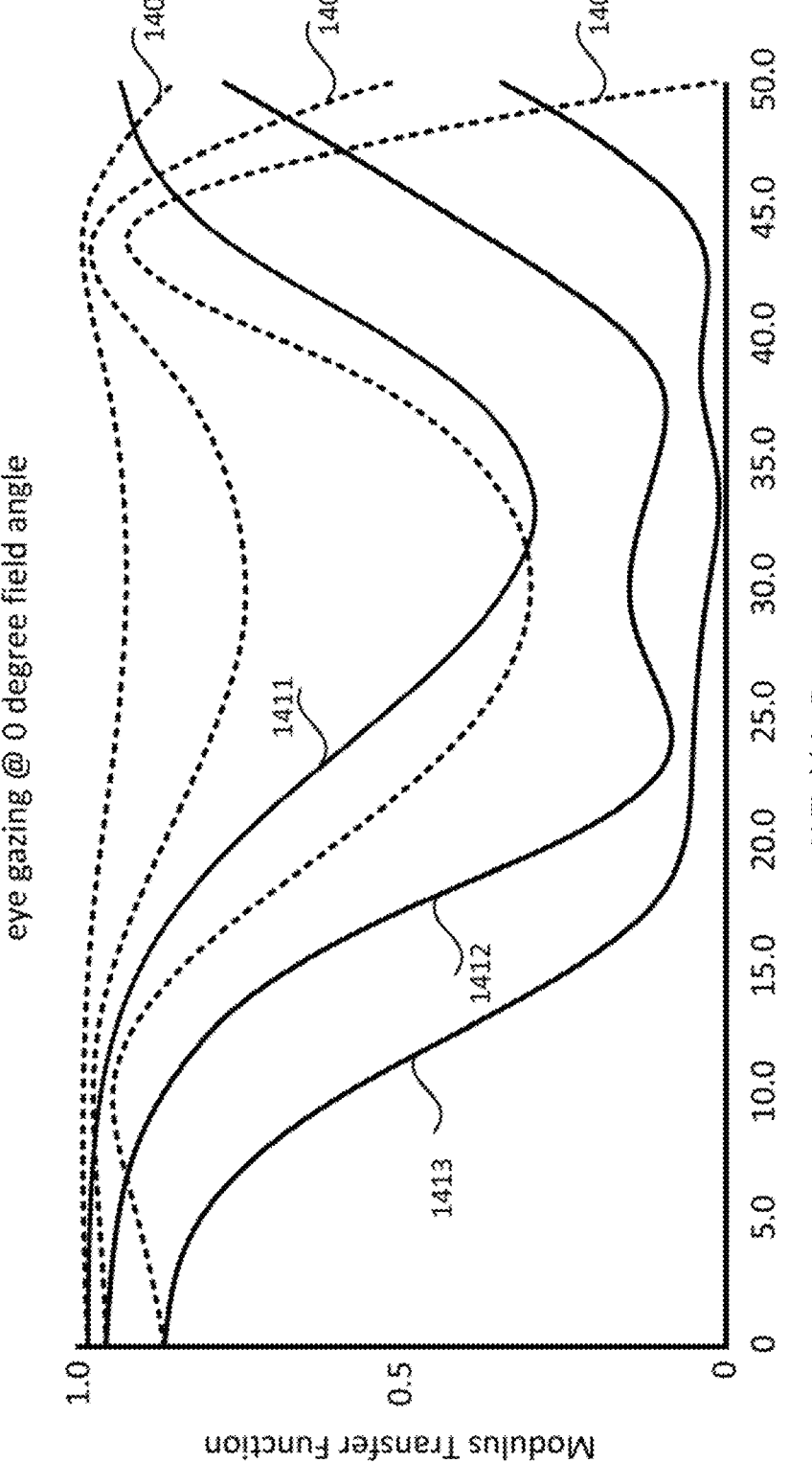
FIGS. 14-17 show MTFs of the optical system that employs the first lens according to an embodiment of the disclosure.

FIGS. 14-17 show MTFs of the optical system (110) in FIG. 11A that employs the first lens (1131) with the shapes shown in FIGS. 12-13. In FIG. 14, the eye (60) is positioned at the area (151) with the eye (60) gaze straight ahead without rotation (e.g., the field angle or eye rotation is) 0°. FIG. 14 shows sagittal and tangential MTFs versus a field angle (e.g., a Y field). Curves (1401)-(1403) represent the sagittal MTFs at resolutions 5 lp/mm, 10 lp/mm, and 20 lp/mm, respectively, for the field angle from 0° to 50°. Curves (1411)-(1413) represent the tangential MTFs at the resolutions 5 lp/mm, 10 lp/mm, and 20 lp/mm, respectively, for the field angle from 0° to 50°.

Figure 15:
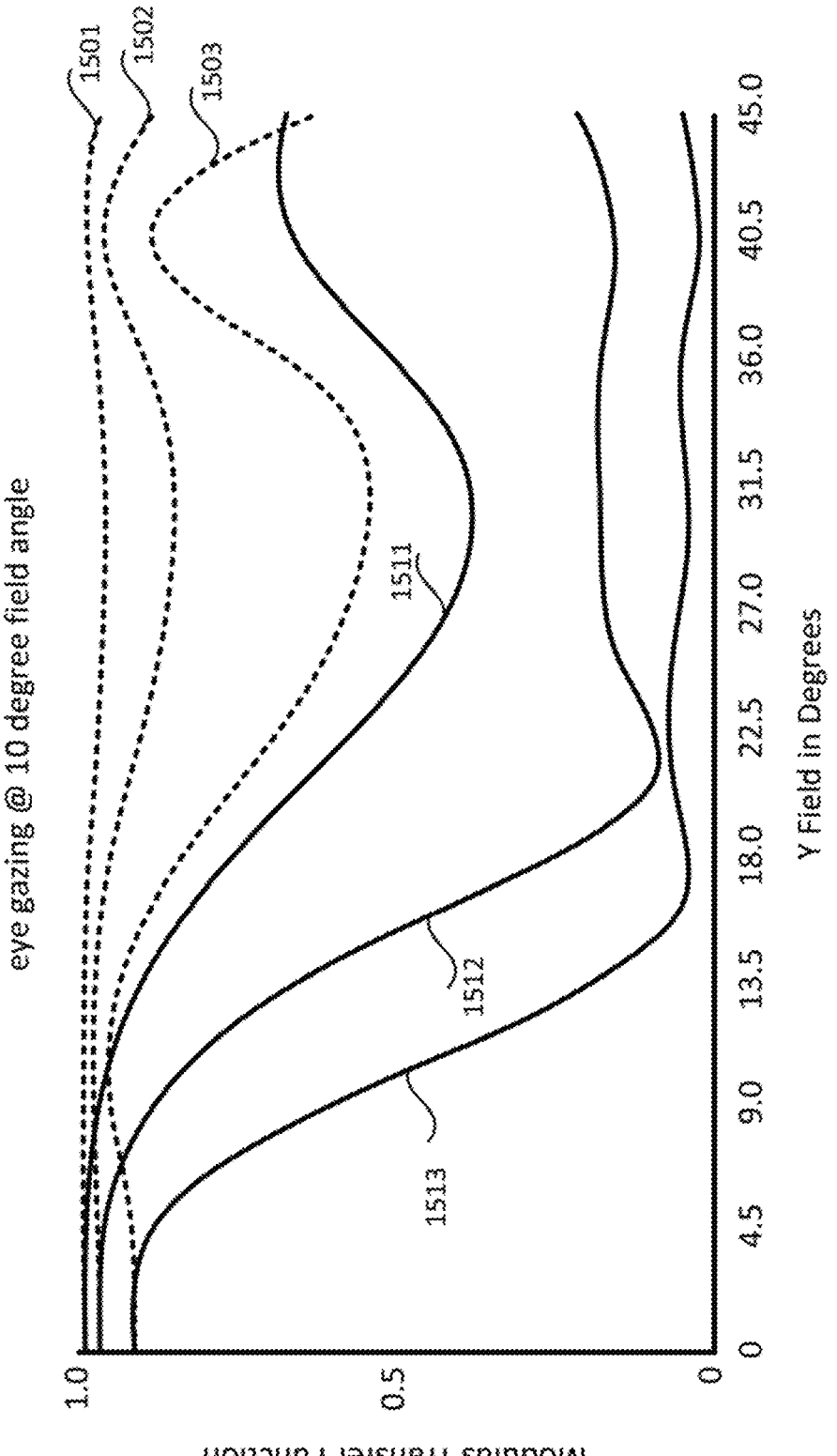

In FIG. 15, the eye (60) is positioned at the area (151) with the eye (60) gaze at a field angle of 10°. FIG. 15 shows sagittal and tangential MTFs versus a field angle (e.g., a Y field). Curves (1501)-(1503) represent the sagittal MTFs at the resolutions 5 lp/mm, 10 lp/mm, and 20 lp/mm, respectively, for the field angle from 0° to 45°. Curves (1511)-(1513) represent the tangential MTFs at the resolutions 5 lp/mm, 10 lp/mm, and 20 lp/mm, respectively, for the field angle from 0° to 45°.

Figure 16:
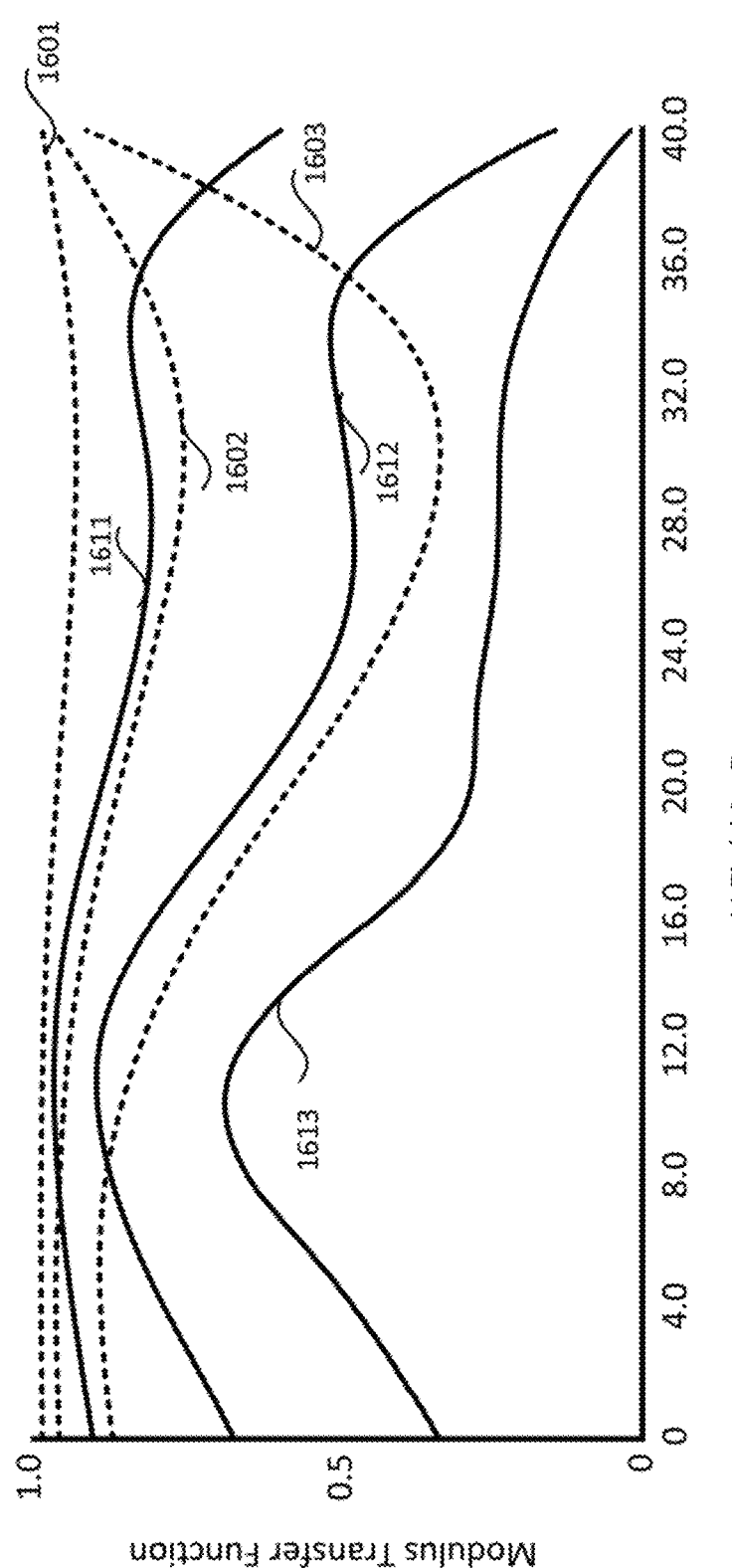

In FIG. 16, the eye (60) is positioned at the area (151) with the eye (60) gaze at a field angle of 20°. FIG. 16 shows sagittal and tangential MTFs versus a field angle (e.g., a Y field). Curves (1601)-(1603) represent the sagittal MTFs at the resolutions 5 lp/mm, 10 lp/mm, and 20 lp/mm, respectively, for the field angle from 0° to 40°. Curves (1611)-(1613) represent the tangential MTFs at the resolutions 5 lp/mm, 10 lp/mm, and 20 lp/mm, respectively, for the field angle from 0° to 40°.

Figure 17:
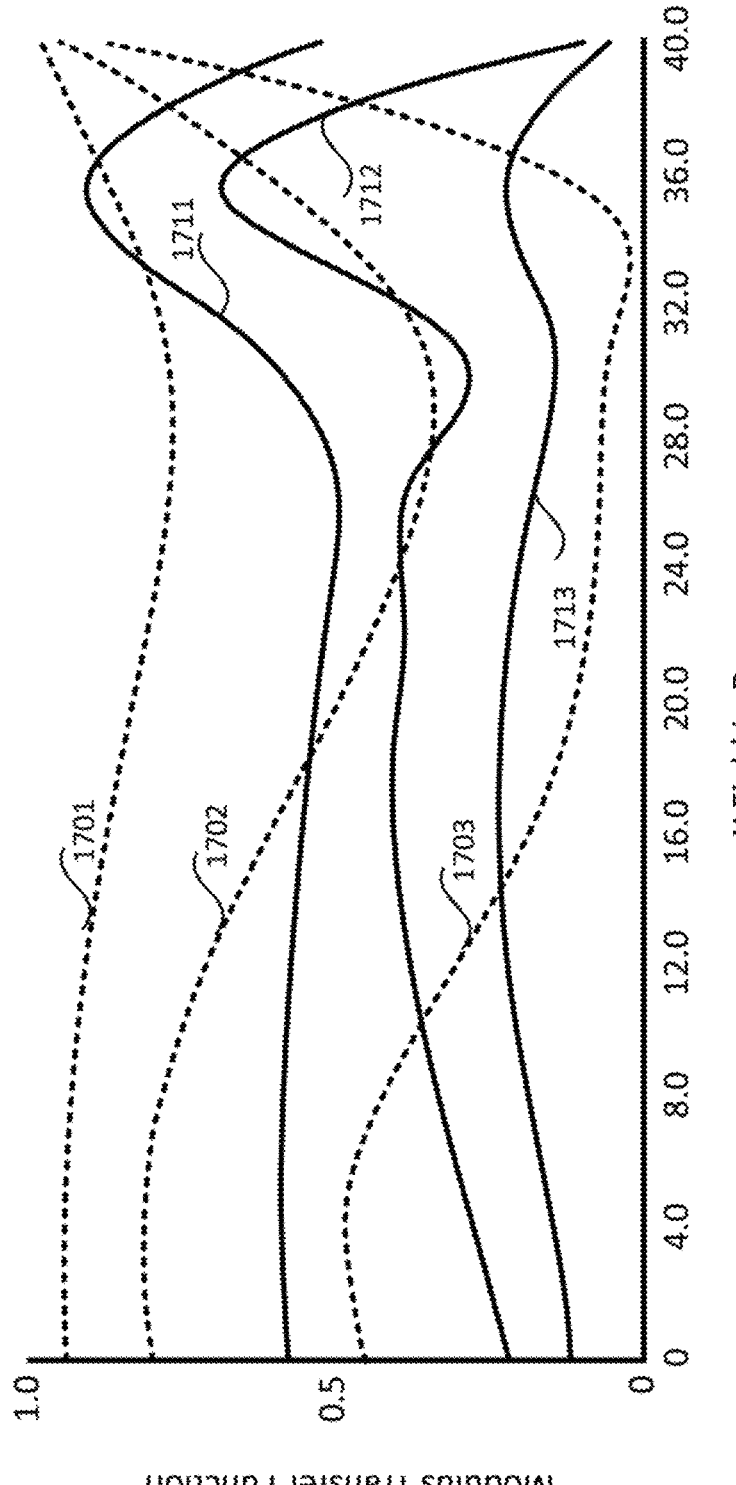

In FIG. 17, the eye (60) is positioned at the area (151) with the eye (60) gaze at a field angle of 30°. FIG. 17 shows sagittal and tangential MTFs versus a field angle (e.g., a Y field). Curves (1701)-(1703) represent the sagittal MTFs at the resolutions 5 lp/mm, 10 lp/mm, and 20 lp/mm, respectively, for the field angle from 0° to 40°. Curves (1711)-(1713) represent the tangential MTFs at the resolutions 5 lp/mm, 10 lp/mm, and 20 lp/mm, respectively, for the field angle from 0° to 40° to 40°.

Referring back to FIGS. 14-17, the MTFs can vary with the resolution (e.g., 5, 10, or 20 lp/mm) and/or a gazing angle of an eye. In particular, the MTF at the resolution 20 lp/mm is larger than 80% at a 0° field angle and an eye rotation to 0°, the MTF at the resolution 20 lp/mm is larger than 40% at a 10° field angle and an eye rotation to 10°, the MTF at the resolution 20 lp/mm is larger than 25% at a 20° field angle and an eye rotation to 20°, and the MTF at the resolution 10 lp/mm is larger than 25% at a 30° field angle and an eye rotation to 30°. FIGS. 14-17 shows that the FOV can be 100° (e.g., from a field angle of −50° to a field angle of) 50°, for example, at the resolution of 10 lp/mm.

Figure 18:
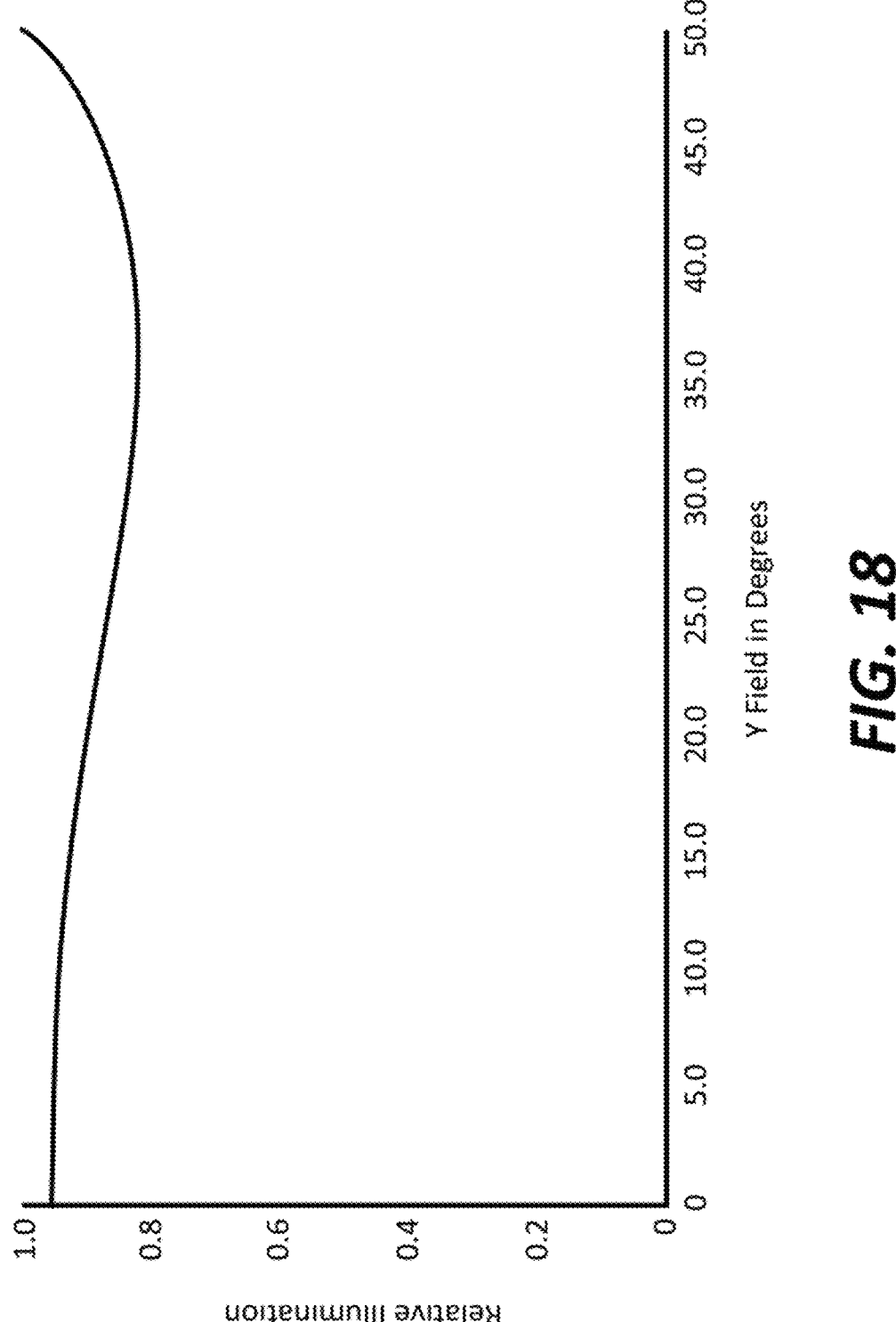
FIG. 18 shows relative illumination versus the field angle from 0° to 50°.

FIG. 18 shows relative illumination versus the field angle from 0° to 50°. The relative illumination across the FOV (e.g., 100°) is above 80% or 0.8.

Various shapes including various wavy shapes of the first surface (135) and/or the second surface (136) of the first lens (131) can be employed to achieve similar performances, such as a high FOV, a high resolution with low aberration, and a compact form factor of the optical system (110). FIGS. 19-23 show exemplary shapes of the first surface (135) and/or the second surface (136) of the first lens (131) according to embodiments of the disclosure.

Figure 19:
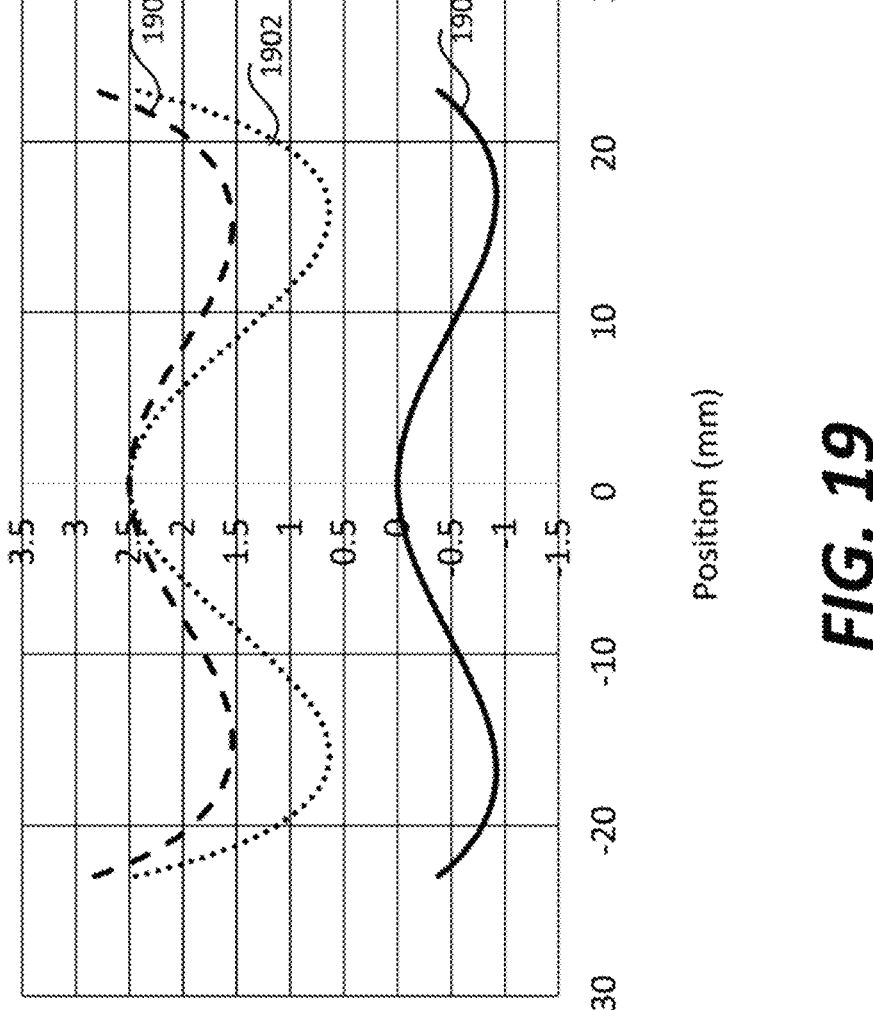
FIGS. 19-23 show exemplary shapes of the first surface and/or the second surface of the first lens according to embodiments of the disclosure.

Referring to FIGS. 1B and 19, the vertex V2 of the second surface (136) of the first lens (131) is located at Z=0 mm, the vertex V1 of the first surface (135) of the first lens (131) is located at Z=2.5 mm, and a center thickness of the first lens (131) along the optical axis (160) is 2.5 mm. FIG. 19 shows a thickness profile (1901) of the first lens (131) indicating a variation of the thickness (parallel to the Z axis) of the first lens (131) versus a position (e.g., a Y coordinate parallel to the Y axis) from the optical axis (160). Y coordinates of the US Patent Page 19-20 vertex V1 and the vertex V2 are 0 mm. The thickness profile (1901) indicates that the thickness variation of the first lens (131) is similar to that described in FIG. 1C.

FIG. 19 further shows a relationship between a sag (1903) of the second surface (136) of the first lens (131) and the position along the axis (e.g., the Y axis) that is perpendicular to the optical axis (160). In an example, the sag (1903) indicates a relationship between a Z coordinate (Z position) of the second surface (136) versus the Y coordinate of the second surface (136). FIG. 19 also shows a position profile (1902) versus the position along the axis (e.g., the Y axis) that is perpendicular to the optical axis (160). In an example, the position profile (1902) indicates a relationship between a Z coordinate of the first surface (135) versus the Y coordinate of the first surface (135). In an example, the Z coordinate of the first surface (135) can be a sum of (i) a sag of the first surface (135) of the first lens (131) as described in FIG. 1B and (ii) the center thickness (e.g., 2.5 mm) of the first lens (131). The position profile (1902) and the sag (1903) indicate that the wavy shapes of the first surface (135) and the second surface (136) shown in FIG. 19 are similar to those described in FIGS. 1B-1C.

In an example, the display system (100) employing the lens system (130) described in FIG. 19 achieves the following parameters: the eye relief (or the distance D3) between the area (151) and the first lens (1131) is 15 mm. The display size is indicated by a diagonal display size of 1.3 inches. The FOV is 90°.

Figure 20:
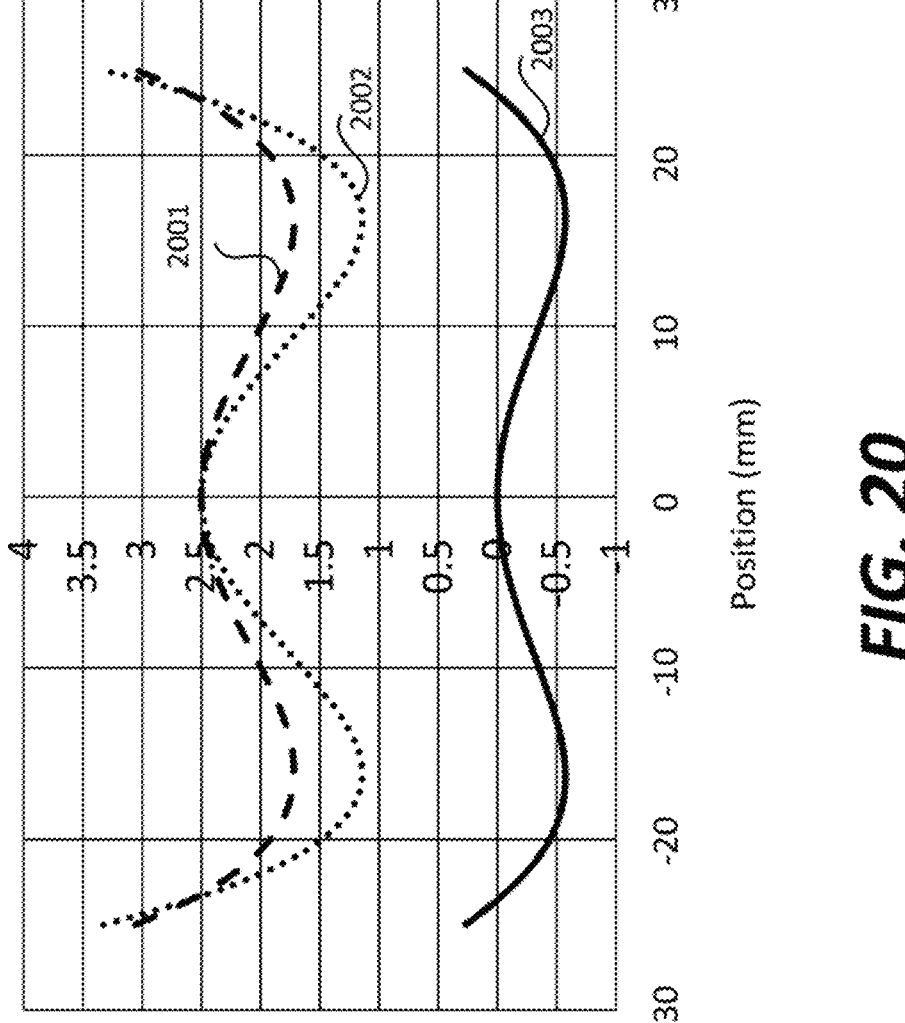

Referring to FIGS. 1B and 20, the vertex V2 of the second surface (136) of the first lens (131) is located at Z=0 mm, the vertex V1 of the first surface (135) of the first lens (131) is located at Z=2.5 mm, and the center thickness of the first lens (131) along the optical axis (160) is 2.5 mm. FIG. 20 shows a thickness profile (2001) of the first lens (131) indicating a variation of the thickness (parallel to the Z axis) of the first lens (131) versus a position (e.g., the Y coordinate) from the optical axis (160). Y coordinates of the vertex V1 and the vertex V2 are 0 mm. The thickness profile (2001) indicates that the thickness variation of the first lens (131) is similar to that described in FIG. 1C. Referring to FIG. 20, in an example, when the diameter of the first lens (131) is larger than a value (e.g., about 23 mm), a thickness near or at the edge of the first lens (131) can be larger than the center thickness of the first lens (131).

FIG. 20 further shows a relationship between a sag (2003) of the second surface (136) of the first lens (131) and the position along the axis (e.g., the Y axis) that is perpendicular to the optical axis (160). In an example, the sag (2003) indicates a relationship between a Z coordinate of the second surface (136) versus the Y coordinate of the second surface (136). Referring to FIG. 20, in an example, when the diameter of the first lens (131) is larger than a value (e.g., about 23 mm), a sag near or at the edge of the first lens (131) is larger than 0. FIG. 20 also shows a position profile (2002) versus the position along the axis (e.g., the Y axis) that is perpendicular to the optical axis (160). In an example, the position profile (2002) indicates a relationship between a Z coordinate of the first surface (135) versus the Y coordinate of the first surface (135). In an example, the Z coordinate of the first surface (135) can be a sum of (i) a sag of the first surface (135) of the first lens (131) as described in FIG. 1B and (ii) the center thickness (e.g., 2.5 mm) of the first lens (131). The position profile (2002) and the sag (2003) indicate that the wavy shapes of the first surface (135) and the second surface (136) shown in FIG. 20 are similar to those described in FIGS. 1B-1C.

In an example, the display system (100) employing the lens system (130) described in FIG. 20 achieves the following parameters: the eye relief (or the distance D3) between the area (151) and the first lens (1131) is 15 mm. The display size is indicated by a diagonal display size of 1.3 inches. The FOV is 100°.

Figure 21:
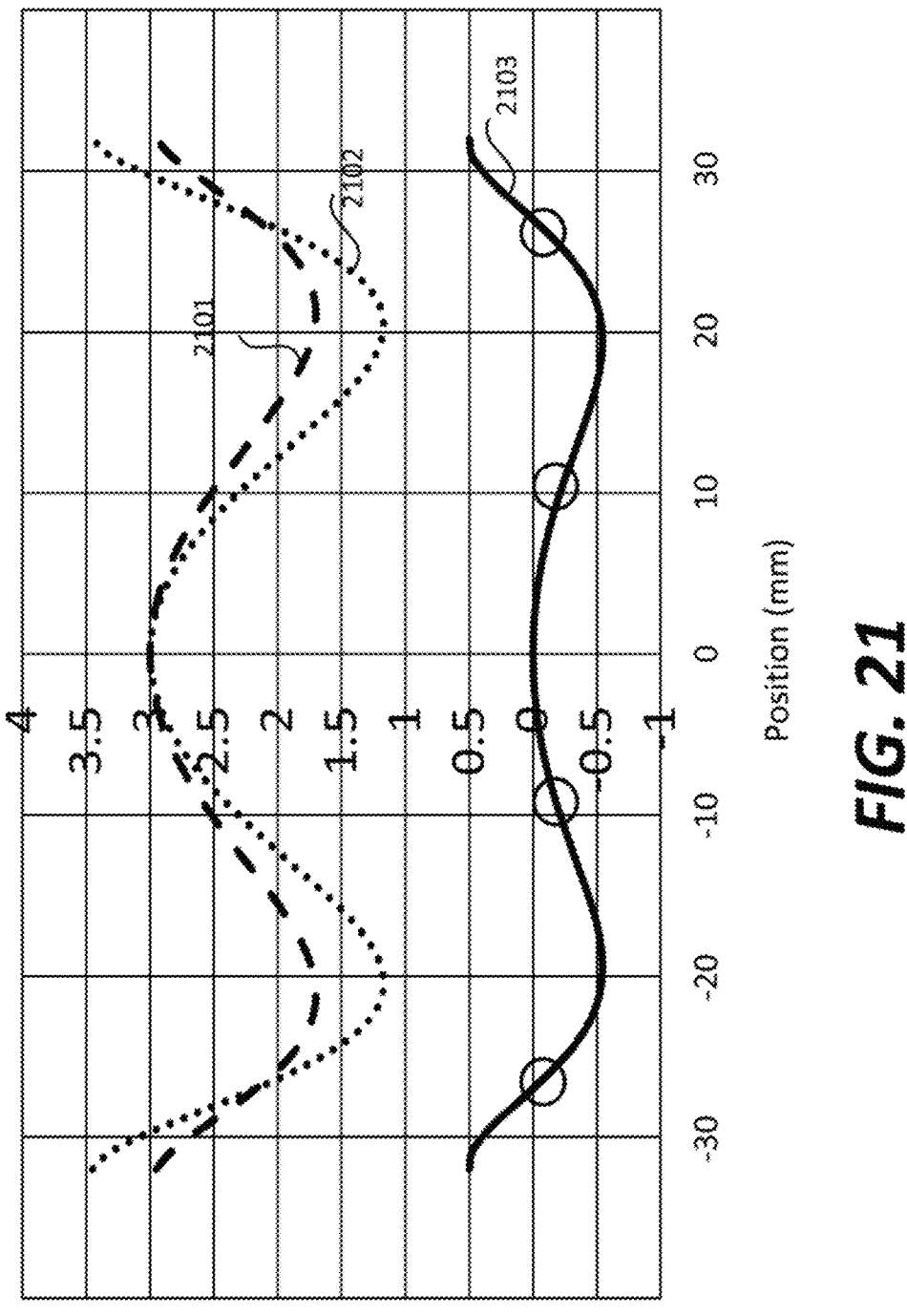

Referring to FIGS. 1B and 21, the vertex V2 of the second surface (136) of the first lens (131) is located at Z=0 mm, the vertex V1 of the first surface (135) of the first lens (131) is located at Z=3 mm, and the center thickness of the first lens (131) along the optical axis (160) is 3 mm. FIG. 21 shows a thickness profile (2101) of the first lens (131) indicating a variation of the thickness (parallel to the Z axis) of the first lens (131) versus a position (e.g., the Y coordinate) from the optical axis (160). Y coordinates of the vertex V1 and the vertex V2 are 0 mm. The thickness profile (2101) indicates that the thickness variation of the first lens (131) is similar to that described in FIG. 1C.

FIG. 21 further shows a relationship between a sag (2103) of the second surface (136) of the first lens (131) and the position along the axis (e.g., the Y axis) that is perpendicular to the optical axis (160). In an example, the sag (2103) indicates a relationship between a Z coordinate of the second surface (136) versus the Y coordinate of the second surface (136). Referring to FIG. 21, in an example, when the diameter of the first lens (131) is larger than a value (e.g., about 27 mm), a sag near or at the edge of the first lens (131) is larger than 0. FIG. 21 also shows a position profile (2102) versus the position along the axis (e.g., the Y axis) that is perpendicular to the optical axis (160). In an example, the position profile (2102) indicates a relationship between a Z coordinate of the first surface (135) versus the Y coordinate of the first surface (135). In an example, the Z coordinate of the first surface (135) can be a sum of (i) a sag of the first surface (135) of the first lens (131) as described in FIG. 1B and (ii) the center thickness (e.g., 3 mm) of the first lens (131). The position profile (2102) and the sag (2103) indicate that the wavy shapes of the first surface (135) and the second surface (136) shown in FIG. 21 are similar to those described in FIGS. 1B-1C.

In an example, the display system (100) employing the lens system (130) described in FIG. 21 achieves the following parameters: the eye relief (or the distance D3) between the area (151) and the first lens (1131) is 15 mm. The distance D4 (i.e., the lens track length) between the display device (120) and the first lens (1131) is 14.7 mm. The display size as indicated by the display image circle has a radius of 17.1 mm. The FOV is 110°. In an example, a gap between the display device (120) and the beam splitter (141) is 1 mm. In an example, referring to FIG. 1A, the gap (133) between the first lens (131) and the second lens (132) is 1.2 mm, for example, along the optical axis (160).

Figure 22:
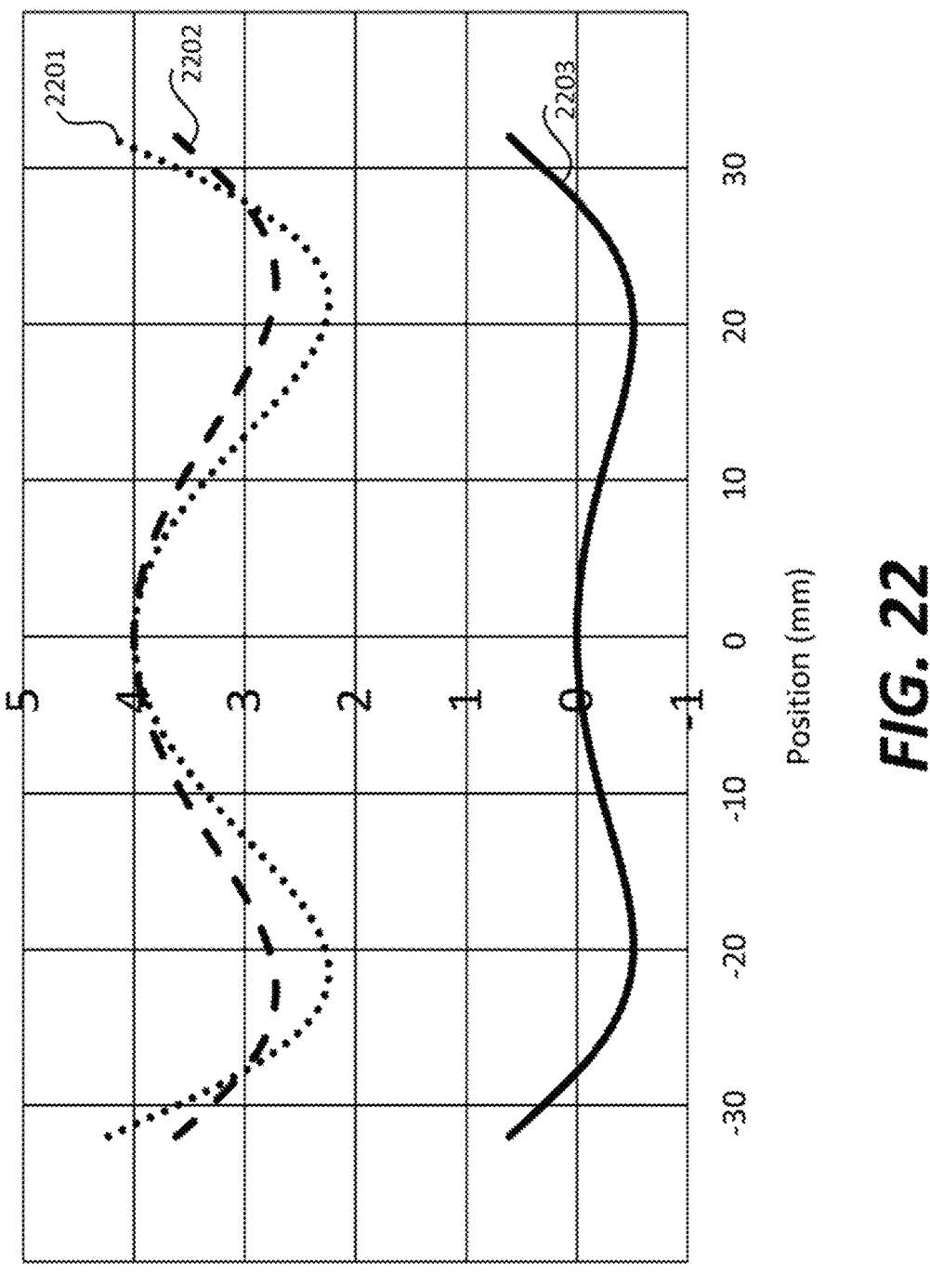

Referring to FIGS. 1B and 22, the vertex V2 of the second surface (136) of the first lens (131) is located at Z=0 mm, the vertex V1 of the first surface (135) of the first lens (131) is located at Z=4 mm, and the center thickness of the first lens (131) along the optical axis (160) is 3 mm. FIG. 22 shows a thickness profile (2201) of the first lens (131) indicating a variation of the thickness (parallel to the Z axis) of the first lens (131) versus a position (e.g., the Y coordinate) from the optical axis (160). Y coordinates of the vertex V1 and the vertex V2 are 0 mm. The thickness profile (2201) indicates that the thickness variation of the first lens (131) is similar to that described in FIG. 1C.

FIG. 22 further shows a relationship between a sag (2203) of the second surface (136) of the first lens (131) and the position along the axis (e.g., the Y axis) that is perpendicular to the optical axis (160). In an example, the sag (2203) indicates a relationship between a Z coordinate of the second surface (136) versus the Y coordinate of the second surface (136). Referring to FIG. 22, in an example, when the diameter of the first lens (131) is larger than a value (e.g., about 28 mm), a sag near or at the edge of the first lens (131) is larger than 0. FIG. 22 also shows a position profile (2202) versus the position along the axis (e.g., the Y axis) that is perpendicular to the optical axis (160). In an example, the position profile (2202) indicates a relationship between a Z coordinate of the first surface (135) versus the Y coordinate of the first surface (135). In an example, the Z coordinate of the first surface (135) can be a sum of (i) a sag of the first surface (135) of the first lens (131) as described in FIG. 1B and (ii) the center thickness (e.g., 4 mm) of the first lens (131). The position profile (2202) and the sag (2203) indicate that the wavy shapes of the first surface (135) and the second surface (136) shown in FIG. 21 are similar to those described in FIGS. 1B-1C.

In an example, the display system (100) employing the lens system (130) described in FIG. 22 achieves the following parameters: the eye relief (or the distance D3) between the area (151) and the first lens (1131) is 15 mm. The distance D4 (i.e., the lens track length) between the display device (120) and the first lens (1131) is 16.1 mm. The display size as indicated by the display image circle has a radius of 18.9 mm. The FOV is 110°. In an example, a gap between the display device (120) and the beam splitter (141) is 1.5 mm. In an example, referring to FIG. 1A, the gap (133) between the first lens (131) and the second lens (132) is 2.1 mm, for example, along the optical axis (160).

Figure 23:
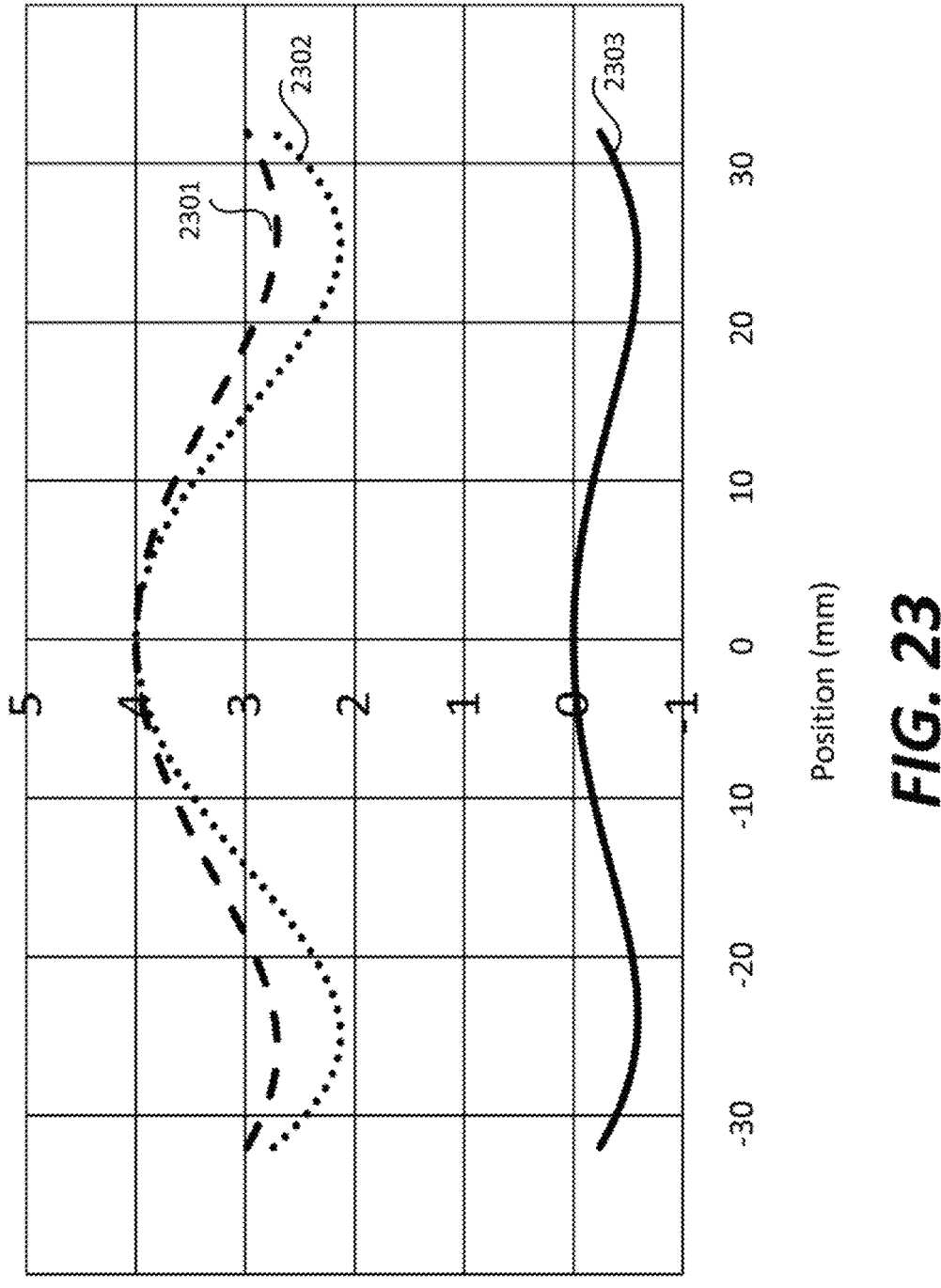

Referring to FIGS. 1B and 23, the vertex V2 of the second surface (136) of the first lens (131) is located at Z=0 mm, the vertex V1 of the first surface (135) of the first lens (131) is located at Z=4 mm, and the center thickness of the first lens (131) along the optical axis (160) is 3 mm. FIG. 23 shows a thickness profile (2301) of the first lens (131) indicating a variation of the thickness (parallel to the Z axis) of the first lens (131) versus a position (e.g., the Y coordinate) from the optical axis (160). Y coordinates of the vertex V1 and the vertex V2 are 0 mm. The thickness profile (2301) indicates that the thickness variation of the first lens (131) is similar to that described in FIG. 1C.

FIG. 23 further shows a relationship between a sag (2303) of the second surface (136) of the first lens (131) and the position along the axis (e.g., the Y axis) that is perpendicular to the optical axis (160). In an example, the sag (2303) indicates a relationship between a Z coordinate of the second surface (136) versus the Y coordinate of the second surface (136). FIG. 23 also shows a position profile (2302) versus the position along the axis (e.g., the Y axis) that is perpendicular to the optical axis (160). In an example, the position profile (2302) indicates a relationship between a Z coordinate of the first surface (135) versus the Y coordinate of the first surface (135). In an example, the Z coordinate of the first surface (135) can be a sum of (i) a sag of the first surface (135) of the first lens (131) as described in FIG. 1B and (ii) the center thickness (e.g., 4 mm) of the first lens (131). The position profile (2302) and the sag (2303) indicate that the wavy shapes of the first surface (135) and the second surface (136) shown in FIG. 23 are similar to those described in FIGS. 1B-1C.

Referring to FIGS. 19-23, each thickness profile has three maximal thicknesses, for example, the center thickness and the edge or peripheral region thicknesses. Each thickness profile has two minimal thicknesses. Each of the minimal thickness is between the center thickness and one of the edge thicknesses.

In an example, the display system (100) employing the lens system (130) described in FIG. 23 achieves the following parameters: the eye relief (or the distance D3) between the area (151) and the first lens (1131) is 15 mm. The distance D4 (i.e., the lens track length) between the display device (120) and the first lens (1131) is 20.3 mm. The display size as indicated by the display image circle has a radius of 23 mm. The FOV is 110°. In an example, a gap between the display device (120) and the beam splitter (141) is 5.8 mm. In an example, referring to FIG. 1A, the gap (133) between the first lens (131) and the second lens (132) is 3 mm, for example, along the optical axis (160).

A wavy shape of a surface of a lens can be described using various examples. In an example, the wavy shape includes an inner surface of the surface that is curved toward a direction (e.g., convex) and an outer surface of the surface that is curved away from the direction (e.g., concave) where the inner surface is surrounded by the outer surface, such as described in FIG. 1B. In an example, the wavy shape includes an inner surface of the surface that is concave and an outer surface of the surface that is convex where the inner surface is surrounded by the outer surface. In an example, a curve formed by an interception of the wavy surface of the lens and a cross-sectional plane (parallel to an optical axis of the lens) has at least four inflection points, such as shown in FIG. 1B. In an example, a plane (e.g., the XY plane) that is perpendicular to the optical axis of the lens intercepts the surface of the lens at least four times, such as shown in FIG. 1B. In an example, a thickness of a central region of the lens decreases from a center of the lens, and a thickness of a peripheral region of the lens increases from a boundary of the central region. In an example, the wavy shape of the surface is indicated by a relationship between a sag of the surface and a position along an axis (e.g., the Y axis) that is perpendicular to the optical axis. For example, in FIG. 5, the sag oscillates multiple times with the position along the Y axis, thus indicating the wavy shape of the first surface (135).

The display system (100) can have any suitable parameters, such as the FOV, the lens track length, the eye relief, the diameter of the first lens (131) or (1131) and the second lens (132) or (1132), the gap between the display device (120) and the lens system (130) or (1300) (e.g., the gap between the display device (120) and the beam splitter (141)), the gap (133) between the first lens (131) and the second lens (132), the display size, a size of the area (151), and the like. Certain parameter(s) of the display system (100) can be related. For example, the diameter of the first lens (131) or (1131) and the second lens (132) or (1132) can be selected based on other parameter(s), such as the eye relief and the FOV of the display system (100). In an example, the diameter of the first lens (131) or (1131) and the second lens (132) or (1132) is larger than or equal to 46 mm when the FOV of the display system (100) is larger than or equal to 90° at the eye relief of 15 mm.

In an embodiment, the display system (100) is used as a NED system, and the display system (100) employing the optical system (110) can be configured with the lens track length less than or equal to a value or within a certain range (e.g., between 12 mm to 20 mm), the eye relief less than or equal to a value or within a certain range (e.g., 15 mm). In an example, the diameter of the first lens (131) or (1131) and the second lens (132) or (1132) is larger than or equal to 46 mm or within a certain range. The gap between the display device (120) and the lens system (130) or (1300) (e.g., the gap between the display device (120) and the beam splitter (141)) can vary, for example, from 1 to 6 mm. The gap (133) between the first lens (131) and the second lens (132) can vary, for example, from 1 to 3 mm. The FOV of the display system (100) can be larger than or equal to 90°. The display size can be larger than a radius of 14 mm. In an example, the size of the area (151) is configured to be 5 mm (e.g., a 5 mm pupil size of the eye (60)) to accommodate variations of pupil sizes for different persons and under different light conditions. For example, a pupil size in adults can vary from 2 to 4 mm in diameter in bright light to 4 to 8 mm in the dark.

In an example, the eye relief is 15 mm, the center thickness of the first lens (131) is 3 mm, the gap (133) between the first lens (131) and the second lens (132) is 2 mm, and an edge thickness (e.g., the largest thickness of the second lens (132)) of the second lens (132) is 3 mm. In an example, the diameter of the first lens (131) or (1131) and the second lens (132) or (1132) is 46 mm for the FOV of the display system (100) being 90°. In an example, the diameter of the first lens (131) or (1131) and the second lens (132) or (1132) is 34 mm at the eye relief of 10 mm.

Embodiments in the disclosure describe the display system (100) that include a lens having at least one surface that is wavy (e.g., the first surface (135) of the first lens (131)) such as described in FIGS. 1A-1D, 4, 5, and 19-23. The lens having the at least one surface that is wavy can be used with another lens such as the second lens (132). Further, the lens having the at least one surface that is wavy can be used with multiple lenses, such as two lenses, three lenses, or the like. In an example, multiple lenses where each of the multiple lenses has at lease one surface that is wavy can be employed in the display system (100). The at least one surface that is wavy can be similar or identical to the first surface (135) described in the disclosure.

Referring back to FIG. 1A, the shift block (170) is coupled to the optical system (110) to apply suitable spatial pixel shift adjustments to the virtual image 199. The controller (180) is coupled to the optical system (110) and the shift block (170) to control the operations of the optical system (110) and the shift block (170).

The shift block (170) can apply the spatial pixel shift adjustment mechanically or optically. The shift block (170) can include a mechanical shifter to apply the spatial pixel shift adjustment. In some examples, the mechanical shifter can shift the display device (120) to apply the spatial pixel shift adjustment. In some examples, the mechanical shifter can shift at least one optical element (e.g., the first lens (131) or the second lens (132) in the lens system (130)) to apply the spatial pixel shift adjustment. A relatively small adjustment to the gap (133) can be amplified, for example, 3 times, due to the folded path (125) in the optical cavity.

The display system (100) can include other suitable mechanical, electrical and optical components. For example, the display system (100) includes a frame (101) that can protect other components of the display system (100). In another example, the display system (100) can include a strap (not shown) to fit the display system (100) on a user's head. In another example, the display system (100) can include communication components (not shown, e.g., communication software and hardware) to wirelessly communicate with a network, a host device, and/or other device. In some examples, the display system (100) can include a light combiner that can combine the virtual content and see-through real environment.

Embodiments in the disclosure may be used separately or combined in any order.

A computer or computer-readable medium can control various aspects of an HMD system in which the display system (100) including the optical system (110) is incorporated. Various aspects of the display system (100) including controlling movements and positioning of the optical components (e.g., the first lens (131), the second lens (132), the display device (120)) can be implemented as computer software using computer-readable instructions and physically stored in one or more computer-readable media. For example, FIG. 24 shows a computer system (2400) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 24:
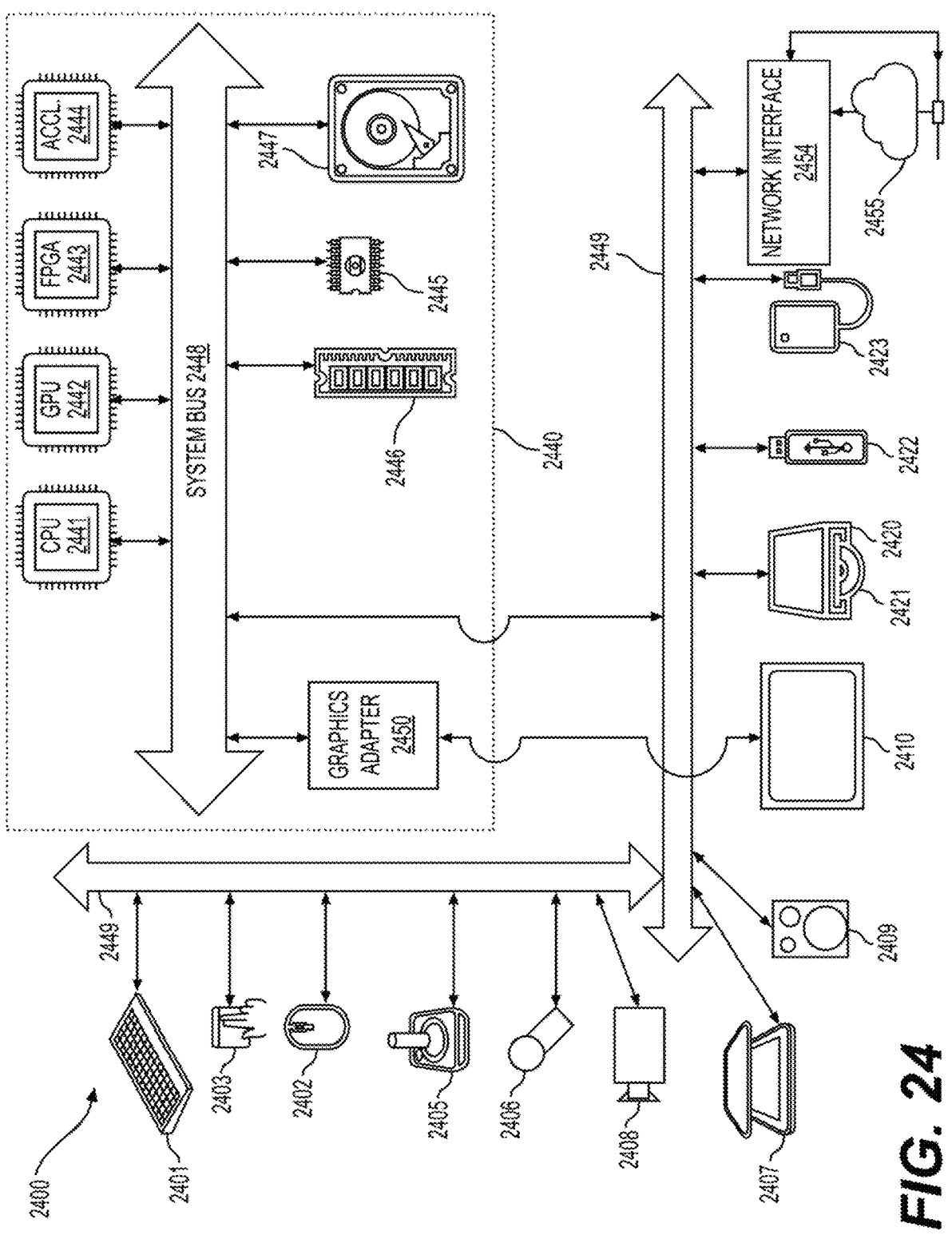
FIG. 24 is a schematic illustration of a computer system in accordance with an embodiment.

The components shown in FIG. 24 for computer system (2400) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2400).

Computer system (2400) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2401), mouse (2402), trackpad (2403), touch-screen (2410), data-glove (not shown), joystick (2405), microphone (2406), scanner (2407), camera (2408).

Computer system (2400) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2410), data-glove (not shown), or joystick (2405), but there can also be tactile feedback devices that do not serve as input devices), audio output devices (such as: speakers (2409), headphones (not depicted)), visual output devices (such as touch-screens (2410) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2400) can also include human accessible storage devices and their associated media such as optical media including CD/DVD ROM/RW (2420) with CD/DVD or the like media (2421), thumb-drive (2422), removable hard drive or solid state drive (2423), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2400) can also include an interface (2454) to one or more communication networks (2455). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2449) (such as, for example USB ports of the computer system (2400)); others are commonly integrated into the core of the computer system (2400) by attachment to a system bus as described below (for example Ethernet interface into a PC computer system or cellular network interface into a smartphone computer system). Using any of these networks, computer system (2400) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2440) of the computer system (2400).

The core (2440) can include one or more Central Processing Units (CPU) (2441), Graphics Processing Units (GPU) (2442), specialized programmable processing units in the form of Field Programmable Gate Areas (FPGA) (2443), hardware accelerators (2444) for certain tasks, graphics adapters (2450), and so forth. These devices, along with Read-only memory (ROM) (2445), Random-access memory (2446), internal mass storage (2447) such as internal non-user accessible hard drives, SSDs, and the like, may be connected through a system bus (2448). In some computer systems, the system bus (2448) can be accessible in the form of one or more physical plugs to enable extensions by additional CPUs, GPU, and the like. The peripheral devices can be attached either directly to the core's system bus (2448), or through a peripheral bus (2449). In an example, the touch-screen (2410) can be connected to the graphics adapter (2450). Architectures for a peripheral bus include PCI, USB, and the like.

CPUs (2441), GPUs (2442), FPGAs (2443), and accelerators (2444) can execute certain instructions that, in combination, can make up the aforementioned computer code. That computer code can be stored in ROM (2445) or RAM (2446). Transitional data can be also be stored in RAM (2446), whereas permanent data can be stored for example, in the internal mass storage (2447). Fast storage and retrieve to any of the memory devices can be enabled through the use of cache memory, that can be closely associated with one or more CPU (2441), GPU (2442), mass storage (2447), ROM (2445), RAM (2446), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (2400) having architecture, and specifically the core (2440) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2440) that are of non-transitory nature, such as core-internal mass storage (2447) or ROM (2445). The software implementing various embodiments of the present disclosure can be stored in such devices and executed by core (2440). A computer-readable medium can include one or more memory devices or chips, according to particular needs. The software can cause the core (2440) and specifically the processors therein (including CPU, GPU, FPGA, and the like) to execute particular processes or particular parts of particular processes described herein, including defining data structures stored in RAM (2446) and modifying such data structures according to the processes defined by the software. In addition or as an alternative, the computer system can provide functionality as a result of logic hardwired or otherwise embodied in a circuit (for example: accelerator (2444)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A first lens, comprising:
an optically transparent member having a first surface and a second surface, the optically transparent member being configured to receive light from a display device via the first surface, the received light exiting the optically transparent member through the second surface, wherein
the first surface and the second surface of the optically transparent member are aspheric,
an inner surface of the first surface is convex,
an outer surface of the first surface is concave, the inner surface being surrounded by the outer surface of the first surface, a curve formed by an interception of the first surface of the first lens and a cross-sectional plane has at least four inflection points, the cross-sectional plane being parallel to an optical axis of the first lens, and a plane that is perpendicular to the optical axis of the first lens intercepts the second surface of the first lens four times.

2. The first lens according to claim 1, wherein a sagitta difference between (i) a minimum sagitta at a first position of the first surface of the first lens and (ii) a maximum sagitta at a second position of the first surface of the first lens is from 1.5 millimeters (mm) to 2.5 mm.

3. The first lens according to claim 2, wherein a sagitta difference between (i) a minimum sagitta at a first position of the second surface of the first lens and (ii) a maximum sagitta at a second position of the second surface of the first lens is from 0.6 mm and 0.8 mm.

4. A lens system comprising:

the first lens according to claim 1, and a second lens configured to direct the light from the display device to the first lens, the first lens being positioned between the second lens and a light receiver, the second lens being a converging lens.

5. The lens system according to claim 4, wherein the first lens and the second lens are separated by a gap.

6. An optical system, comprising:

the lens system according to claim 4, a beam splitter configured to partially transmit and partially reflect light beams from the display device, a reflective polarizer configured to pass through light having a first linear polarization state and reflect light having a second linear polarization state that is orthogonal to the first linear polarization state, and a quarter waveplate (QWP) that is positioned between the beam splitter and the reflective polarizer, wherein the optical axis of the first lens and an optical axis of the second lens are identical in the lens system, the beam splitter is on a first surface of the second lens that is configured to face the display device, and the reflective polarizer is on the second surface of the first lens.

7. The optical system according to claim 6, wherein the QWP is on a surface of (i) the first lens or (ii) the second lens.

8. The optical system according to claim 6, wherein the optical system includes the display device, a pixel array in the display device being configured to generate light beams, a polarization state of the light beams being a first circular polarization state, an optical cavity is formed between the beam splitter and the reflective polarizer, the optical cavity includes the first lens, the second lens, a gap between the first lens and the second lens, and the QWP, the beam splitter partially transmits one of the light beams, after the one of the light beams passes the optical cavity for a first time, the first circular polarization state of the one of the light beams being converted to the second linear polarization state by the QWP, the reflective polarizer reflects the one of the light beams having the second linear polarization state, after the one of the light beams passes the optical cavity for a second time, the one of the light beams is reflected by the beam splitter, after the one of the light beams passes the optical cavity for a third time, the second linear polarization state of the one of the light beams is converted to the first linear polarization state by the QWP, and the reflective polarizer transmits the one of the light beams having the first linear polarization state such that the one of the light beams is directed to the light receiver.

9. The optical system according to claim 8, wherein the optical system is included in a head mounted display (HMD), and a field of view of the optical system is larger than or equal to 90°, a distance between the light receiver and the first lens is 15±2 millimeters (mm), a lens track length that is a distance between the second lens and the display device is from 12 to 21 mm, and a diagonal size of a region in the display device that generates the light beams is from 1.4 inches to 2.6 inches.

10. A first lens, comprising:

an optically transparent member having a first surface and a second surface, the optically transparent member being configured to receive light from a display device via the first surface, the received light exiting the optically transparent member through the second surface, wherein the first surface and the second surface of the optically transparent member are aspheric, a thickness of a central region of the first lens decreases from a center of the first lens, a thickness of a peripheral region of the first lens increases from a boundary of the central region, a curve formed by an interception of the first surface of the first lens and a cross-sectional plane has at least four inflection points, the cross-sectional plane being parallel to an optical axis of the first lens, and a plane that is perpendicular to the optical axis of the first lens intercepts the second surface of the first lens four times.

11. The first lens according to claim 10, wherein a sagitta difference between (i) a minimum sagitta at a first position of the first surface of the first lens and (ii) a maximum sagitta at a second position of the first surface of the first lens is from 1.5 millimeters (mm) to 2.5 mm.

12. The first lens according to claim 11, wherein a sagitta difference between (i) a minimum sagitta at a first position of the second surface of the first lens and (ii) a maximum sagitta at a second position of the second surface of the first lens is from 0.6 mm and 0.8 mm.

13. A lens system comprising:

the first lens according to claim 10, and a second lens configured to direct the light from the display device to the first lens, the first lens being positioned between the second lens and a light receiver, the second lens being a converging lens.

14. The lens system according to claim 13, wherein the first lens and the second lens are separated by a gap.

15. An optical system, comprising:

the lens system according to claim 13, a beam splitter configured to partially transmit and partially reflect light beams from the display device, a reflective polarizer configured to pass through light having a first linear polarization state and reflect light having a second linear polarization state that is orthogonal to the first linear polarization state, and a quarter waveplate (QWP) that is positioned between the beam splitter and the reflective polarizer, wherein the optical axis of the first lens and an optical axis of the
second lens are identical in the lens system, the beam splitter is on a first surface of the second lens
that is configured to face the display device, and the reflective polarizer is on the second surface of the first
lens.

16. The optical system according to claim 15, wherein the optical system is included in a head mounted display
(HMD), and a field of view of the optical system is larger than or equal
to 90°, a distance between the light receiver and the first
lens is 15±2 millimeters (mm), a lens track length that
is a distance between the second lens and the display
device is from 12 to 21 mm, and a diagonal size of a
region in the display device that generates the light
beams is from 1.4 inches to 2.6 inches.

\* \* \* \* \*